United States Patent
Fulkerson et al.

(10) Patent No.: US 12,482,131 B2
(45) Date of Patent: Nov. 25, 2025

(54) EXTENDED REALITY TRACKING USING SHARED POSE DATA

(71) Applicant: Snap Inc., Santa Monica, CA (US)

(72) Inventors: Brian Fulkerson, London (GB); Thomas Muttenthaler, Vienna (AT); Georgios Papandreou, London (GB); Daniel Wolf, Mödling (AT)

(73) Assignee: Snap Inc., Santa Monica, CA (US)

( * ) Notice: Subject to any disclaimer, the term of this patent is extended or adjusted under 35 U.S.C. 154(b) by 98 days.

(21) Appl. No.: 18/450,137

(22) Filed: Aug. 15, 2023

(65) Prior Publication Data

US 2025/0022162 A1  Jan. 16, 2025

(30) Foreign Application Priority Data

Jul. 10, 2023 (GR) ................ 20230100556

(51) Int. Cl.
| | | |
|---|---|---|
| *G06T 7/73* | (2017.01) | |
| *G06T 7/20* | (2017.01) | |
| *G06T 19/00* | (2011.01) | |

(52) U.S. Cl.
CPC ............ *G06T 7/73* (2017.01); *G06T 7/20* (2013.01); *G06T 19/006* (2013.01); *G06T 2207/30196* (2013.01); *G06T 2207/30241* (2013.01)

(58) Field of Classification Search
None
See application file for complete search history.

(56) References Cited

U.S. PATENT DOCUMENTS

| | | | |
|---|---|---|---|
| 5,880,731 | A | 3/1999 | Liles et al. |
| 6,023,270 | A | 2/2000 | Brush, II et al. |
| 6,223,165 | B1 | 4/2001 | Lauffer |
| 6,772,195 | B1 | 8/2004 | Hatlelid et al. |
| 6,842,779 | B1 | 1/2005 | Nishizawa |
| 7,342,587 | B2 | 3/2008 | Danzig et al. |
| 7,468,729 | B1 | 12/2008 | Levinson |
| 7,636,755 | B2 | 12/2009 | Blattner et al. |
| 7,639,251 | B2 | 12/2009 | Gu et al. |
| 7,775,885 | B2 | 8/2010 | Van Luchene et al. |
| 7,859,551 | B2 | 12/2010 | Bulman et al. |

(Continued)

FOREIGN PATENT DOCUMENTS

| | | |
|---|---|---|
| CA | 1304162 C | 6/1992 |
| CA | 1307050 C | 9/1992 |

(Continued)

OTHER PUBLICATIONS

Nakamura, Atsuyuki, et al. "A Mutual Motion Capture System for Face-to-face Collaboration." ICAT-EGVE. 2017.*

(Continued)

*Primary Examiner* — Ryan M Gray
(74) *Attorney, Agent, or Firm* — Schwegman Lundberg & Woessner, P.A.

(57) ABSTRACT

Examples disclosed herein relate to the use of shared pose data in extended reality (XR) tracking. A communication link is established between a first XR device and a second XR device. The second XR device is worn by a user. The first XR device receives pose data of the second XR device via the communication link and captures an image of the user. The user is identified based on the image and the pose data.

20 Claims, 13 Drawing Sheets

(56) References Cited

U.S. PATENT DOCUMENTS

| | | |
|---|---|---|
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,342,929 B2 * | 5/2016 | Kamuda ................ G06T 15/04 |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,846,972 B2 | 12/2017 | Montgomerie et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,102,680 B2 | 10/2018 | Jurgenson et al. |
| 10,116,598 B2 | 10/2018 | Tucker et al. |
| 10,155,168 B2 | 12/2018 | Blackstock et al. |
| 10,217,488 B1 | 2/2019 | Huang |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,269,180 B2 | 4/2019 | Yamamoto et al. |
| 10,319,149 B1 | 6/2019 | Cowburn et al. |
| 10,362,219 B2 | 7/2019 | Wilson et al. |
| 10,445,925 B2 * | 10/2019 | Tokubo ................ G06F 3/0346 |
| 10,475,225 B2 | 11/2019 | Park et al. |
| 10,482,677 B1 * | 11/2019 | Iyer ........................ G06F 17/16 |
| 10,504,266 B2 | 12/2019 | Blattner et al. |
| 10,559,107 B1 | 2/2020 | Charlton et al. |
| 10,565,795 B2 | 2/2020 | Charlton et al. |
| 10,573,048 B2 | 2/2020 | Ni et al. |
| 10,607,053 B1 | 3/2020 | Boyd et al. |
| 10,645,092 B1 | 5/2020 | Bonar et al. |
| 10,657,701 B2 | 5/2020 | Osman et al. |
| 10,679,428 B1 | 6/2020 | Chen et al. |
| 10,748,302 B1 * | 8/2020 | Dine ........................ G06T 19/00 |
| 10,776,981 B1 | 9/2020 | Gorbatyuk et al. |
| 10,789,453 B2 | 9/2020 | Savchenkov et al. |
| 10,803,664 B2 | 10/2020 | McPhee et al. |
| 10,857,450 B1 | 12/2020 | Aman et al. |
| 10,902,661 B1 | 1/2021 | Mourkogiannis et al. |
| 10,902,684 B2 | 1/2021 | Srinivasan et al. |
| 10,908,865 B2 * | 2/2021 | Vembar ................ G09G 5/363 |
| 10,956,743 B1 | 3/2021 | Li et al. |
| 10,997,787 B2 | 5/2021 | Ge et al. |
| 11,050,691 B1 | 6/2021 | Depue et al. |
| 11,055,891 B1 | 7/2021 | Ofek et al. |
| 11,063,937 B1 | 7/2021 | Son et al. |
| 11,087,543 B1 | 8/2021 | Cowburn et al. |
| 11,092,998 B1 | 8/2021 | Castañeda et al. |
| 11,112,945 B1 | 9/2021 | Al Majid et al. |
| 11,165,734 B1 | 11/2021 | Desserrey et al. |
| 11,169,675 B1 | 11/2021 | Anvaripour et al. |
| 11,170,393 B1 | 11/2021 | Ma et al. |
| 11,176,737 B2 | 11/2021 | Hare et al. |
| 11,189,104 B2 | 11/2021 | Goodrich et al. |
| 11,195,018 B1 | 12/2021 | Cowburn et al. |
| 11,204,959 B1 | 12/2021 | Boyd et al. |
| 11,212,331 B1 | 12/2021 | Gaiduchenko et al. |
| 11,217,020 B2 | 1/2022 | Goodrich et al. |
| 11,227,442 B1 | 1/2022 | Goodrich et al. |
| 11,227,637 B1 | 1/2022 | Collins et al. |
| 11,232,040 B1 | 1/2022 | Ahmed et al. |
| 11,258,738 B1 | 2/2022 | Cieslak et al. |
| 11,263,817 B1 | 3/2022 | Goodrich et al. |
| 11,270,491 B2 | 3/2022 | Monroy-Hernández et al. |
| 11,275,453 B1 | 3/2022 | Tham et al. |
| 11,276,190 B2 | 3/2022 | Duan et al. |
| 11,360,733 B2 | 6/2022 | Cardenas Gasca et al. |
| 11,587,255 B1 | 2/2023 | Micusik et al. |
| 11,893,301 B2 | 2/2024 | Cardenas Gasca et al. |
| 12,293,433 B2 | 5/2025 | Hong et al. |
| 2002/0067362 A1 | 6/2002 | Agostino Nocera et al. |
| 2002/0169644 A1 | 11/2002 | Greene |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0176921 A1 | 8/2007 | Iwasaki et al. |
| 2007/0198744 A1 | 8/2007 | Wensley et al. |
| 2008/0094417 A1 | 4/2008 | Cohen |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |

(56) References Cited

U.S. PATENT DOCUMENTS

| | | |
|---|---|---|
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn et al. |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0214585 A1 | 8/2012 | Paquet |
| 2013/0044129 A1 | 2/2013 | Latta et al. |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2013/0286004 A1 | 10/2013 | Mcculloch et al. |
| 2013/0293468 A1 | 11/2013 | Perez et al. |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0128161 A1 | 5/2014 | Latta et al. |
| 2014/0129343 A1 | 5/2014 | Finster et al. |
| 2015/0062162 A1 | 3/2015 | Kim et al. |
| 2015/0206349 A1 | 7/2015 | Rosenthal et al. |
| 2015/0306496 A1 | 10/2015 | Haseltine |
| 2016/0133230 A1 | 5/2016 | Daniels et al. |
| 2016/0134840 A1 | 5/2016 | Mcculloch |
| 2016/0234149 A1 | 8/2016 | Tsuda et al. |
| 2016/0350973 A1* | 12/2016 | Shapira ................... G06F 3/011 |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0169617 A1 | 6/2017 | Rodriguez, II |
| 2017/0199855 A1 | 7/2017 | Fishbeck |
| 2017/0235848 A1 | 8/2017 | Van Dusen et al. |
| 2017/0237789 A1 | 8/2017 | Hamner et al. |
| 2017/0310934 A1 | 10/2017 | Du et al. |
| 2017/0312634 A1 | 11/2017 | Ledoux et al. |
| 2017/0358140 A1* | 12/2017 | Kohler ............... G02B 27/0172 |
| 2018/0005429 A1* | 1/2018 | Osman ................. A63F 13/56 |
| 2018/0047200 A1 | 2/2018 | O'hara et al. |
| 2018/0088663 A1 | 3/2018 | Zhang et al. |
| 2018/0113587 A1 | 4/2018 | Allen et al. |
| 2018/0115503 A1 | 4/2018 | Baldwin et al. |
| 2018/0121762 A1 | 5/2018 | Han et al. |
| 2018/0239144 A1 | 8/2018 | Woods et al. |
| 2018/0268589 A1 | 9/2018 | Grant |
| 2018/0315076 A1 | 11/2018 | Andreou |
| 2018/0315133 A1 | 11/2018 | Brody et al. |
| 2018/0315134 A1 | 11/2018 | Amitay et al. |
| 2018/0350144 A1 | 12/2018 | Rathod |
| 2019/0001223 A1 | 1/2019 | Blackstock et al. |
| 2019/0054379 A1 | 2/2019 | Ackley et al. |
| 2019/0057616 A1 | 2/2019 | Cohen et al. |
| 2019/0066387 A1 | 2/2019 | Grossmann et al. |
| 2019/0107990 A1 | 4/2019 | Spivack et al. |
| 2019/0107991 A1 | 4/2019 | Spivack et al. |
| 2019/0151757 A1 | 5/2019 | Kozloski et al. |
| 2019/0188920 A1 | 6/2019 | Mcphee et al. |
| 2019/0251752 A1 | 8/2019 | Rodriguez, II |
| 2019/0272674 A1 | 9/2019 | Comer et al. |
| 2019/0295320 A1 | 9/2019 | Ghatak et al. |
| 2019/0310757 A1 | 10/2019 | Lee et al. |
| 2019/0311513 A1 | 10/2019 | Han et al. |
| 2019/0318540 A1 | 10/2019 | Piemonte et al. |
| 2019/0355181 A1 | 11/2019 | Srinivasan et al. |
| 2019/0356705 A1 | 11/2019 | Escudero et al. |
| 2020/0007906 A1 | 1/2020 | Chui |
| 2020/0059502 A1 | 2/2020 | Iyer et al. |
| 2020/0066049 A1 | 2/2020 | Sun et al. |
| 2020/0098187 A1 | 3/2020 | Herscher et al. |
| 2020/0150435 A1 | 5/2020 | Rodriguez, II |
| 2020/0162851 A1 | 5/2020 | Wilde |
| 2020/0167120 A1 | 5/2020 | Rakshit et al. |
| 2020/0218411 A1 | 7/2020 | Grantham et al. |
| 2020/0219312 A1 | 7/2020 | Jurgenson et al. |
| 2020/0234480 A1 | 7/2020 | Volkov et al. |
| 2020/0310601 A1 | 10/2020 | Anvaripour et al. |
| 2020/0311426 A1 | 10/2020 | Charlton et al. |
| 2020/0331914 A1 | 10/2020 | Burk et al. |
| 2020/0351353 A1 | 11/2020 | Al Majid et al. |
| 2020/0356760 A1 | 11/2020 | Li et al. |
| 2020/0360823 A1 | 11/2020 | Cahill et al. |
| 2020/0380784 A1* | 12/2020 | Iyer ......................... G06F 3/011 |
| 2020/0410764 A1 | 12/2020 | Cowburn et al. |
| 2020/0410773 A1 | 12/2020 | Li et al. |
| 2020/0412864 A1 | 12/2020 | Al Majid et al. |
| 2020/0412975 A1 | 12/2020 | Al Majid et al. |
| 2021/0019739 A1 | 1/2021 | Almonte et al. |
| 2021/0041997 A1 | 2/2021 | Voss |
| 2021/0042724 A1 | 2/2021 | Rathod |
| 2021/0056760 A1 | 2/2021 | Cowburn et al. |
| 2021/0065448 A1 | 3/2021 | Goodrich et al. |
| 2021/0065464 A1 | 3/2021 | Goodrich et al. |
| 2021/0067756 A1 | 3/2021 | Goodrich et al. |
| 2021/0067836 A1 | 3/2021 | Hornsby et al. |
| 2021/0074069 A1 | 3/2021 | Charlton et al. |
| 2021/0076173 A1 | 3/2021 | Monroy-Hernandez et al. |
| 2021/0081088 A1 | 3/2021 | Voss |
| 2021/0089179 A1 | 3/2021 | Grantham et al. |
| 2021/0097245 A1 | 4/2021 | Monroy-Hernández |
| 2021/0097286 A1 | 4/2021 | Lehrich et al. |
| 2021/0097743 A1 | 4/2021 | Krishnan Gorumkonda et al. |
| 2021/0097744 A1 | 4/2021 | Krishnan Gorumkonda et al. |
| 2021/0097745 A1 | 4/2021 | Monroy-Hernández et al. |
| 2021/0099551 A1 | 4/2021 | Cieslak et al. |
| 2021/0099639 A1 | 4/2021 | Bartow et al. |
| 2021/0103779 A1 | 4/2021 | Brody |
| 2021/0119884 A1 | 4/2021 | Kim et al. |
| 2021/0149190 A1* | 5/2021 | Johnson ................. G06F 3/011 |
| 2021/0150719 A1 | 5/2021 | Cowburn et al. |
| 2021/0165559 A1 | 6/2021 | Voss et al. |
| 2021/0165998 A1 | 6/2021 | Cao et al. |
| 2021/0174600 A1 | 6/2021 | Hare et al. |
| 2021/0200390 A1 | 7/2021 | Luo et al. |
| 2021/0200426 A1 | 7/2021 | Al Majid et al. |
| 2021/0200776 A1 | 7/2021 | Pounds et al. |
| 2021/0201036 A1 | 7/2021 | Gupta et al. |
| 2021/0201392 A1 | 7/2021 | Aghdaii et al. |
| 2021/0203627 A1 | 7/2021 | Luo et al. |
| 2021/0203628 A1 | 7/2021 | Luo et al. |
| 2021/0240990 A1 | 8/2021 | Charlton et al. |
| 2021/0248827 A1 | 8/2021 | Baier et al. |
| 2021/0279082 A1 | 9/2021 | Wayne et al. |
| 2021/0279842 A1 | 9/2021 | Anilkumar et al. |
| 2021/0303075 A1 | 9/2021 | Cowburn et al. |
| 2021/0303110 A1 | 9/2021 | Giacalone et al. |
| 2021/0303140 A1 | 9/2021 | Mourkogiannis |
| 2021/0304505 A1 | 9/2021 | Anvaripour et al. |
| 2021/0304506 A1 | 9/2021 | Mourkogiannis et al. |
| 2021/0304629 A1 | 9/2021 | Barron et al. |
| 2021/0306451 A1 | 9/2021 | Heikkinen et al. |
| 2021/0312523 A1 | 10/2021 | Luo et al. |
| 2021/0312533 A1 | 10/2021 | Luo et al. |
| 2021/0312672 A1 | 10/2021 | Luo et al. |
| 2021/0312678 A1 | 10/2021 | Luo et al. |
| 2021/0312682 A1 | 10/2021 | Krishnan Gorumkonda et al. |
| 2021/0312690 A1 | 10/2021 | Krishnan Gorumkonda et al. |
| 2021/0319540 A1 | 10/2021 | Cao et al. |
| 2021/0319625 A1 | 10/2021 | Goodrich et al. |
| 2021/0326635 A1 | 10/2021 | Cowburn et al. |
| 2021/0327117 A1 | 10/2021 | Krokhalev et al. |
| 2021/0334993 A1 | 10/2021 | Woodford |

(56) References Cited

U.S. PATENT DOCUMENTS

| | | |
|---|---|---|
| 2021/0335004 A1 | 10/2021 | Zohar et al. |
| 2021/0336908 A1 | 10/2021 | Taitz |
| 2021/0343050 A1 | 11/2021 | Li et al. |
| 2021/0357075 A1 | 11/2021 | Nayar et al. |
| 2021/0360056 A1 | 11/2021 | Baron et al. |
| 2021/0373726 A1 | 12/2021 | Boyd et al. |
| 2021/0373843 A1 | 12/2021 | Hornsby et al. |
| 2021/0382585 A1 | 12/2021 | Collins et al. |
| 2021/0382587 A1 | 12/2021 | Heikkinen et al. |
| 2021/0382616 A1 | 12/2021 | Gale et al. |
| 2021/0383373 A1 | 12/2021 | Eirinberg et al. |
| 2021/0385179 A1 | 12/2021 | Heikkinen et al. |
| 2021/0385180 A1 | 12/2021 | Al Majid et al. |
| 2021/0387090 A1 | 12/2021 | Eirinberg et al. |
| 2021/0387097 A1 | 12/2021 | Desserrey et al. |
| 2021/0389850 A1 | 12/2021 | Charlton et al. |
| 2021/0389851 A1 | 12/2021 | Al Majid et al. |
| 2021/0389852 A1 | 12/2021 | Desserrey et al. |
| 2021/0389932 A1 | 12/2021 | Mandia |
| 2021/0390729 A1 | 12/2021 | Fox-roberts et al. |
| 2021/0390745 A1 | 12/2021 | Rykhliuk et al. |
| 2021/0390784 A1 | 12/2021 | Smith et al. |
| 2021/0392097 A1 | 12/2021 | Ahmed et al. |
| 2021/0392098 A1 | 12/2021 | Gorkin et al. |
| 2021/0392141 A1 | 12/2021 | Mandia |
| 2021/0392459 A1 | 12/2021 | Gorkin et al. |
| 2021/0392460 A1 | 12/2021 | Gorkin et al. |
| 2021/0404831 A1 | 12/2021 | Drummond et al. |
| 2021/0405831 A1 | 12/2021 | Mourkogiannis et al. |
| 2021/0405832 A1 | 12/2021 | Brown et al. |
| 2021/0406447 A1 | 12/2021 | Hermann et al. |
| 2021/0406543 A1 | 12/2021 | Drummond et al. |
| 2021/0406965 A1 | 12/2021 | Anvaripour et al. |
| 2021/0407163 A1 | 12/2021 | Chai et al. |
| 2021/0407506 A1 | 12/2021 | Drummond et al. |
| 2021/0407533 A1 | 12/2021 | Cowburn et al. |
| 2021/0409356 A1 | 12/2021 | Luo et al. |
| 2021/0409502 A1 | 12/2021 | Chepizhenko et al. |
| 2021/0409517 A1 | 12/2021 | Luo et al. |
| 2021/0409610 A1 | 12/2021 | Mandia et al. |
| 2021/0409612 A1 | 12/2021 | Mandia et al. |
| 2021/0409616 A1 | 12/2021 | Chan et al. |
| 2022/0019640 A1 | 1/2022 | Hermann et al. |
| 2022/0020194 A1 | 1/2022 | Luo et al. |
| 2022/0053146 A1 | 2/2022 | Alavi et al. |
| 2022/0070129 A1 | 3/2022 | Boyd et al. |
| 2022/0075591 A1 | 3/2022 | Cardenas Gasca et al. |
| 2022/0075819 A1 | 3/2022 | Boyd et al. |
| 2022/0076017 A1 | 3/2022 | Cowburn et al. |
| 2022/0076492 A1 | 3/2022 | Smith et al. |
| 2022/0076497 A1 | 3/2022 | Goodrich et al. |
| 2022/0076500 A1 | 3/2022 | Goodrich et al. |
| 2022/0076504 A1 | 3/2022 | Goodrich et al. |
| 2022/0078143 A1 | 3/2022 | Eirinberg et al. |
| 2022/0083737 A1 | 3/2022 | Apanovych et al. |
| 2022/0084295 A1 | 3/2022 | Smith et al. |
| 2022/0086111 A1 | 3/2022 | Smith et al. |
| 2022/0086235 A1 | 3/2022 | Al Majid et al. |
| 2022/0086367 A1 | 3/2022 | Boyd et al. |
| 2022/0179665 A1 | 6/2022 | Rathod |
| 2022/0214743 A1 | 7/2022 | Dascola et al. |
| 2022/0276823 A1 | 9/2022 | Cardenas Gasca et al. |
| 2022/0308735 A1 | 9/2022 | Appelbaum et al. |
| 2023/0186521 A1* | 6/2023 | Micusik ............... G06T 19/006 345/419 |
| 2023/0342988 A1 | 10/2023 | Hong et al. |
| 2023/0418542 A1 | 12/2023 | Cardenas Gasca |

FOREIGN PATENT DOCUMENTS

| | | |
|---|---|---|
| CA | 2309056 A1 | 5/1999 |
| CN | 101802547 A | 8/2010 |
| CN | 109863532 A | 6/2019 |
| CN | 110168478 A | 8/2019 |
| CN | 113348650 A | 9/2021 |
| CN | 113631886 A | 11/2021 |
| CN | 113966525 A | 1/2022 |
| CN | 114008577 A | 2/2022 |
| CN | 114041104 A | 2/2022 |
| CN | 114080628 A | 2/2022 |
| CN | 114207567 A | 3/2022 |
| CN | 116113478 A | 5/2023 |
| EP | 2179249 A1 | 4/2010 |
| EP | 2184092 A2 | 5/2010 |
| EP | 3566113 B1 | 2/2021 |
| EP | 3857496 A1 | 8/2021 |
| EP | 3901951 A1 | 10/2021 |
| EP | 3948582 A1 | 2/2022 |
| EP | 3677056 B1 | 3/2022 |
| JP | 2001230801 A | 8/2001 |
| JP | 5497931 B2 | 3/2014 |
| KR | 101445263 B1 | 9/2014 |
| KR | 20190105638 A | 9/2019 |
| KR | 20200037435 A | 4/2020 |
| KR | 20210031768 A | 3/2021 |
| KR | 20210039496 A | 4/2021 |
| KR | 20210046760 A | 4/2021 |
| KR | 20210099624 A | 8/2021 |
| KR | 20210103525 A | 8/2021 |
| KR | 20210123357 A | 10/2021 |
| WO | WO-2003094072 A1 | 11/2003 |
| WO | WO-2004095308 A1 | 11/2004 |
| WO | WO-2006107182 A1 | 10/2006 |
| WO | WO-2007134402 A1 | 11/2007 |
| WO | WO-2012139276 A1 | 10/2012 |
| WO | WO-2013027893 A1 | 2/2013 |
| WO | WO-2013085639 A1 | 6/2013 |
| WO | WO-2013152454 A1 | 10/2013 |
| WO | WO-2013166588 A1 | 11/2013 |
| WO | WO-2014031899 A1 | 2/2014 |
| WO | WO-2014194439 A1 | 12/2014 |
| WO | WO-2016090605 A1 | 6/2016 |
| WO | WO-2017031389 A1 | 2/2017 |
| WO | WO-2018081013 A1 | 5/2018 |
| WO | WO-2018102562 A1 | 6/2018 |
| WO | WO-2018129531 A1 | 7/2018 |
| WO | WO-2018200043 A1 | 11/2018 |
| WO | WO-2019067396 A1 | 4/2019 |
| WO | WO-2019089613 A1 | 5/2019 |
| WO | WO-2019204464 A1 | 10/2019 |
| WO | WO-2020047261 A1 | 3/2020 |
| WO | WO-2020150689 A1 | 7/2020 |
| WO | WO-2020160261 A1 | 8/2020 |
| WO | WO-2020205435 A1 | 10/2020 |
| WO | WO-2021030841 A1 | 2/2021 |
| WO | WO-2021042134 A1 | 3/2021 |
| WO | WO-2021046582 A1 | 3/2021 |
| WO | WO-2021051131 A1 | 3/2021 |
| WO | WO-2021067988 A1 | 4/2021 |
| WO | WO-2021126864 A1 | 6/2021 |
| WO | WO-2021133942 A1 | 7/2021 |
| WO | WO-2021138161 A1 | 7/2021 |
| WO | WO-2021138630 A1 | 7/2021 |
| WO | WO-2021158768 A1 | 8/2021 |
| WO | WO-2021163725 A1 | 8/2021 |
| WO | WO-2021194855 A1 | 9/2021 |
| WO | WO-2021195670 A1 | 9/2021 |
| WO | WO-2021202191 A1 | 10/2021 |
| WO | WO-2021203118 A1 | 10/2021 |
| WO | WO-2021203119 A1 | 10/2021 |
| WO | WO-2021203134 A1 | 10/2021 |
| WO | WO-2021211851 A1 | 10/2021 |
| WO | WO-2021216999 A1 | 10/2021 |
| WO | WO-2021217167 A1 | 10/2021 |
| WO | WO-2021222198 A1 | 11/2021 |
| WO | WO-2021226341 A1 | 11/2021 |
| WO | WO-2021237088 A1 | 11/2021 |
| WO | WO-2021242765 A1 | 12/2021 |
| WO | WO-2021252201 A2 | 12/2021 |
| WO | WO-2021252217 A1 | 12/2021 |
| WO | WO-2021252218 A1 | 12/2021 |
| WO | WO-2021252233 A1 | 12/2021 |
| WO | WO-2021252237 A1 | 12/2021 |

(56) References Cited

FOREIGN PATENT DOCUMENTS

| WO | WO-2021252256 A1 | 12/2021 |
|---|---|---|
| WO | WO-2021252386 A1 | 12/2021 |
| WO | WO-2021252763 A1 | 12/2021 |
| WO | WO-2021257401 A1 | 12/2021 |
| WO | WO-2021257619 A1 | 12/2021 |
| WO | WO-2021263210 A1 | 12/2021 |
| WO | WO-2022005715 A1 | 1/2022 |
| WO | WO-2022005717 A1 | 1/2022 |
| WO | WO-2022005794 A1 | 1/2022 |
| WO | WO-2022005838 A1 | 1/2022 |
| WO | WO-2022005841 A1 | 1/2022 |
| WO | WO-2022005843 A1 | 1/2022 |
| WO | WO-2022005845 A1 | 1/2022 |
| WO | WO-2022006170 A1 | 1/2022 |
| WO | WO-2022006249 A1 | 1/2022 |
| WO | WO-2022006279 A1 | 1/2022 |
| WO | WO-2022006289 A1 | 1/2022 |
| WO | WO-2022006318 A1 | 1/2022 |
| WO | WO-2022015865 A1 | 1/2022 |
| WO | WO-2022047463 A1 | 3/2022 |
| WO | WO-2022047477 A1 | 3/2022 |
| WO | WO-2022055992 A1 | 3/2022 |
| WO | WO-2022056118 A1 | 3/2022 |
| WO | WO-2022056132 A2 | 3/2022 |
| WO | WO-2022056132 A3 | 3/2022 |
| WO | WO-2023212499 A1 | 11/2023 |

OTHER PUBLICATIONS

"U.S. Appl. No. 17/248,981, Non Final Office Action mailed Sep. 30, 2021", 30 pgs.
"U.S. Appl. No. 17/248,981, Notice of Allowance mailed Feb. 16, 2022", 12 pgs.
"U.S. Appl. No. 17/248,981, Response filed Dec. 20, 2021 to Non Final Office Action mailed Sep. 30, 2021", 11 pgs.
"U.S. Appl. No. 17/663,594, Advisory Action mailed Jun. 7, 2023", 4 pgs.
"U.S. Appl. No. 17/663,594, Examiner Interview Summary mailed Jun. 27, 2023", 2 pgs.
"U.S. Appl. No. 17/663,594, Final Office Action mailed Apr. 4, 2023", 51 pgs.
"U.S. Appl. No. 17/663,594, Non Final Office Action mailed Sep. 29, 2022", 65 pgs.
"U.S. Appl. No. 17/663,594, Notice of Allowance mailed Aug. 9, 2023", 14 pgs.
"U.S. Appl. No. 17/663,594, Response filed May 9, 2023 to Final Office Action mailed Apr. 4, 2023", 12 pgs.
"U.S. Appl. No. 17/663,594, Response filed Jun. 29, 2023 to Advisory Action mailed Jun. 7, 2023", 13 pgs.
"U.S. Appl. No. 17/663,594, Response filed Dec. 29, 2022 to Non Final Office Action mailed Sep. 29, 2022", 11 pgs.
"U.S. Appl. No. 17/895,449, Non Final Office Action mailed Jun. 8, 2023", 9 pgs.
"International Application Serial No. PCT/US2021/049672, International Preliminary Report on Patentability mailed Mar. 23, 2023", 17 pgs.
"International Application Serial No. PCT/US2021/049672, International Search Report mailed Mar. 9, 2022", 6 pgs.
"International Application Serial No. PCT/US2021/049672, Invitation to Pay Additional Fees mailed Jan. 14, 2022", 15 pgs.
"International Application Serial No. PCT/US2021/049672, Written Opinion mailed Mar. 9, 2022", 15 pgs.
"International Application Serial No. PCT/US2023/065988, International Search Report mailed Sep. 12, 2023", 5 pgs.
"International Application Serial No. PCT/US2023/065988, Written Opinion mailed Sep. 12, 2023", 5 pgs.

Micusik, Branislav, et al., "Ego-Motion Alignment from Face Detections for Collaborative Augmented Reality", [Online] Retrieved from the Internet: <URL: https://arxiv.org/abs/2010.02153v1>, (Oct. 5, 2020), 25 pgs.
Nakamura, N., et al., "Distributed Virtual Reality System For Cooperative Work, NEC Research And Development", Nippon Electric Ltd. Tokyo, JP, vol. 35, No. 4, (Oct. 1, 1994), 403-409.
"U.S. Appl. No. 17/728,494, Non Final Office Action mailed Dec. 21, 2023", 24 pgs.
"U.S. Appl. No. 17/663,594, Notice of Allowability mailed Jan. 3, 2024", 3 pgs.
"U.S. Appl. No. 17/728,494, Response filed Mar. 19, 2024 to Non Final Office Action mailed Dec. 21, 2023", 10 pgs.
"U.S. Appl. No. 17/728,494, Final Office Action mailed Apr. 11, 2024", 28 pgs.
"U.S. Appl. No. 18/243,815, Non Final Office Action mailed Apr. 19, 2024", 45 pgs.
"U.S. Appl. No. 17/728,494, Response filed Jun. 10, 2024 to Final Office Action mailed Apr. 11, 2024", 11 pgs.
"U.S. Appl. No. 18/243,815, Examiner Interview Summary mailed Jun. 14, 2024", 2 pgs.
"U.S. Appl. No. 18/243,815, Response filed Jun. 20, 2024 to Non Final Office Action mailed Apr. 19, 2024", 13 pgs.
"U.S. Appl. No. 17/728,494, Advisory Action mailed Jul. 11, 2024", 3 pgs.
"U.S. Appl. No. 18/243,815, Final Office Action mailed Aug. 7, 2024", 73 pgs.
"U.S. Appl. No. 17/728,494, Non Final Office Action mailed Aug. 19, 2024", 32 pgs.
"U.S. Appl. No. 18/243,815, Response filed Oct. 7, 2024 to Final Office Action mailed Aug. 7, 2024", 13 pgs.
"International Application Serial No. PCT/US2024/037197, International Search Report mailed Oct. 23, 2024", 4 pgs.
"International Application Serial No. PCT/US2024/037197, Written Opinion mailed Oct. 23, 2024", 6 pgs.
"U.S. Appl. No. 17/728,494, Examiner Interview Summary mailed Oct. 17, 2024", 2 pgs.
"U.S. Appl. No. 18/243,815, Advisory Action mailed Oct. 23, 2024", 4 pgs.
"International Application Serial No. PCT/US2023/065988, International Preliminary Report on Patentability mailed Nov. 7, 2024", 7 pgs.
U.S. Appl. No. 17/248,981 U.S. Pat. No. 11,360,733, filed Feb. 16, 2021, Colocated Shared Augmented Reality Without Shared Backend.
U.S. Appl. No. 17/663,594, filed May 16, 2022, Colocated Shared Augmented Reality Without Shared Backend.
U.S. Appl. No. 18/243,815, filed Sep. 8, 2023, Colocated Shared Augmented Reality.
U.S. Appl. No. 17/728,494, filed Apr. 25, 2022, Real-Time Modifications In Augmented Reality Experiences.
"U.S. Appl. No. 17/728,494, Notice of Allowance mailed Jan. 2, 2025", 10 pgs.
"U.S. Appl. No. 17/728,494, Response filed Nov. 18, 2024 to Non Final Office Action mailed Aug. 19, 2024", 12 pgs.
"Korean Application Serial No. 10-2023-7011672, Notice of Preliminary Rejection mailed Jan. 9, 2025", w/ English Translation, 30 pgs.
"Korean Application Serial No. 10-2023-7011672, Response filed Mar. 7, 2025 to Notice of Preliminary Rejection mailed Jan. 9, 2025", w/ English Claims, 31 pgs.
"Chinese Application Serial No. 202180061711.8, Office Action mailed May 31, 2025", w/ English Translation, 22 pgs.
"European Application Serial No. 23723392.9, Response to Communication pursuant to Rules 161 and 162 EPC filed Jun. 3, 2025", 16 pgs.
Tithi, Jesmin Jahan, et al., "Online and Real-time Object Tracking Algorithm with Extremely Small Matrices", arXiv preprint arXiv:2003.12091v2, (Mar. 22, 2021), 5 pgs.

* cited by examiner

EXTENDED REALITY TRACKING USING SHARED POSE DATA

CLAIM OF PRIORITY

This application claims the benefit of priority to Greece Patent Application Serial No. 20230100556, filed on Jul. 10, 2023, which is incorporated herein by reference in its entirety.

TECHNICAL FIELD

The subject matter disclosed herein generally relates to extended reality (XR). Particularly, but not exclusively, the subject matter relates to tracking techniques for XR devices.

BACKGROUND

Rapid and accurate object tracking can enable an XR device to provide realistic, entertaining, or useful XR experiences. For example, object tracking can allow an XR device to present virtual content on a display of the XR device so as to appear overlaid on a real-world object that is tracked by the XR device.

XR devices commonly use cameras to track objects. However, the tracking of objects in a dynamic environment can present technical challenges. For example, an XR device may use images captured by its cameras to track a pose (position and orientation) of a person in a real-world environment, and render virtual content for display based on the tracked pose. Tracking may be hampered when the person exits and subsequently re-enters a camera field of view of the XR device. This may in turn interfere with the ability of the XR device to render and apply the virtual content in a consistent manner.

BRIEF DESCRIPTION OF THE SEVERAL VIEWS OF THE DRAWINGS

In the drawings, which are not necessarily drawn to scale, like numerals may describe similar components in different views. To identify the discussion of any particular element or act more easily, the most significant digit or digits in a reference number refer to the figure number in which that element is first introduced. Some non-limiting examples are illustrated in the figures of the accompanying drawings in which.

DETAILED DESCRIPTION

Figure 1:
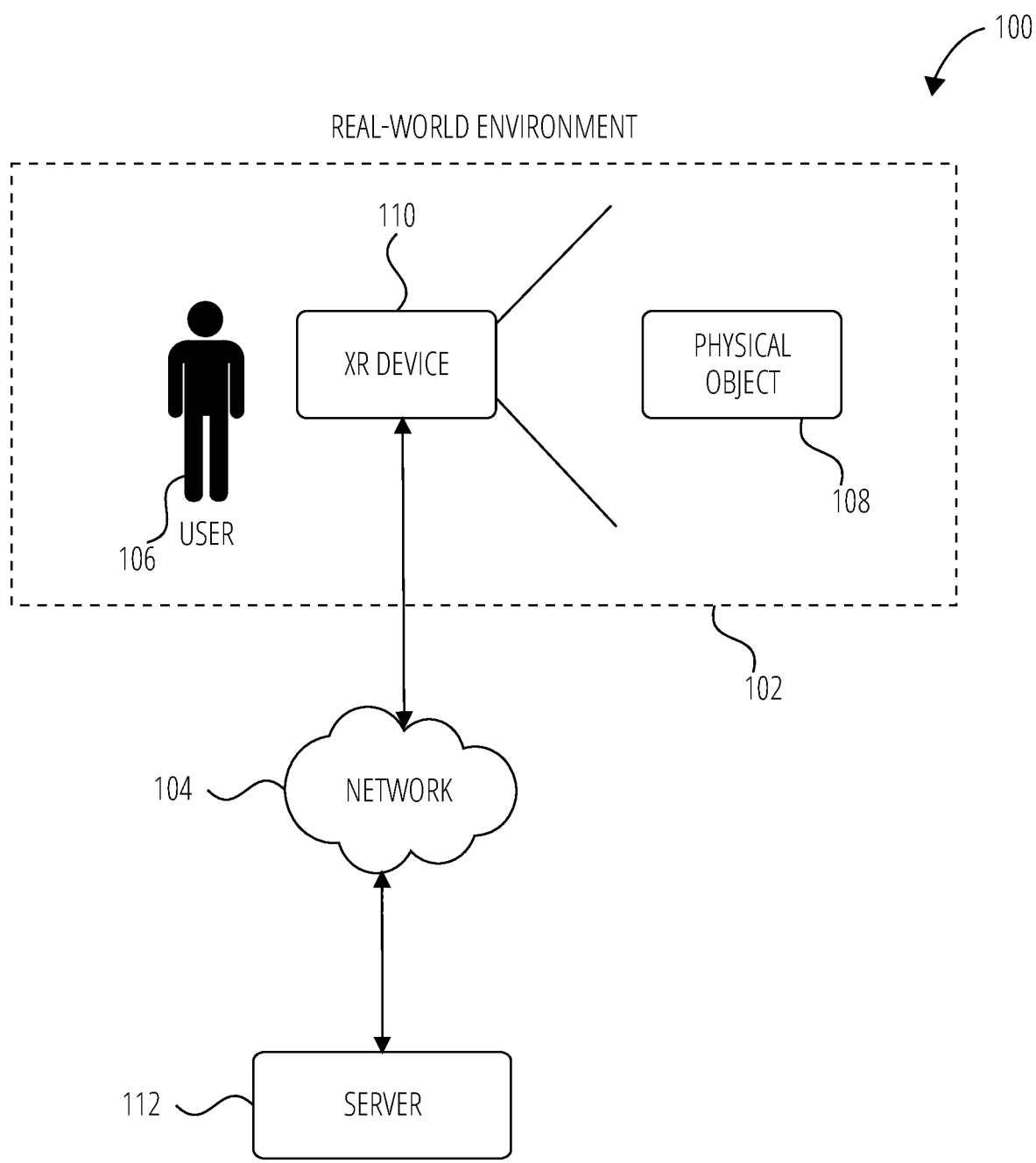
FIG. 1 is a diagrammatic illustration of a network environment for operating an XR device, according to some examples.

The description that follows describes systems, methods, devices, techniques, instruction sequences, or computing machine program products that illustrate examples of the present subject matter. In the following description, for purposes of explanation, numerous specific details are set forth in order to provide an understanding of various examples of the present subject matter. It will be evident, however, to those skilled in the art, that examples of the present subject matter may be practiced without some or other of these specific details. Examples merely typify possible variations. Unless explicitly stated otherwise, structures (e.g., structural components) are optional and may be combined or subdivided, and operations (e.g., in a procedure, algorithm, or other function) may vary in sequence or be combined or subdivided.

The term "augmented reality" (AR) is used herein to refer to an interactive experience of a real-world environment where physical objects, scenes, or environments that reside in the real world are "augmented," modified, or enhanced by computer-generated digital content (also referred to as virtual content or synthetic content). The term "augmentation" is used to refer to any such digital content. An AR device can enable a user to observe a real-world scene while simultaneously seeing virtual content that may be aligned to objects, images, or environments in the field of view of the AR device. AR can also refer to a system that enables a combination of real and virtual worlds, real-time interaction, and three-dimensional (3D) representation of virtual and real objects. A user of an AR system can perceive virtual content that appears to be attached to or to interact with a real-world physical object. The term "AR application" is used herein to refer to a computer-operated application that enables an AR experience.

The term "virtual reality" (VR) is used herein to refer to a simulation experience of a virtual world environment that is distinct from the real-world environment. Computer-generated digital content is displayed in the virtual world environment. A VR device can thus provide a more immersive experience than an AR device. The VR device may block out the field of view of the user with virtual content that is displayed based on a position and orientation of the VR device. VR also refers to a system that enables a user of a VR system to be completely immersed in the virtual world environment and to interact with virtual objects presented in the virtual world environment.

In general, AR and VR devices are referred to as "extended reality" (XR) devices, and related systems are referred to as XR systems. While examples described in the present disclosure focus primarily on XR devices that provide an AR experience, it will be appreciated that at least some aspects of the present disclosure may also be applied to other types of XR experiences.

The term "user session" is used herein to refer to an operation of an application during periods of time. For example, a user session may refer to an operation of an AR application executing on a head-wearable XR device between the time the user puts on the XR device and the time the user takes off the head-wearable device. In some examples, the user session starts when the XR device is turned on or is woken up from sleep mode and stops when the XR device is turned off or placed in sleep mode. In other examples, the session starts when the user runs or starts an AR application, or runs or starts a particular feature of the AR application, and stops when the user ends the AR application or stops the particular features of the AR application. In some examples, and as described further below, a pose sharing session may be established while a user session is in progress to enable an XR device to receive pose data from another XR device.

The term "SLAM" (Simultaneous Localization and Mapping) is used herein to refer to a system used to understand and map a physical environment in real-time. It uses sensors such as cameras, depth sensors, and Inertial Measurement Units (IMUs) to capture data about the environment and then uses that data to create a map of the surroundings of a device while simultaneously determining the device's location within that map. This allows, for example, an XR device to accurately place virtual content, e.g., digital objects, in the real world and track their position as a user moves and/or as objects move.

The term "Inertial Measurement Unit" (IMU) is used herein to refer to a sensor or device that can report on the inertial status of a moving body, including one or more of the acceleration, velocity, orientation, and position of the moving body. In some examples, an IMU enables tracking of movement of a body by integrating the acceleration and the angular velocity measured by the IMU. The term "IMU" can also refer to a combination of accelerometers and gyroscopes that can determine and quantify linear acceleration and angular velocity, respectively. The values obtained from one or more gyroscopes of an IMU can be processed to obtain data including the pitch, roll, and heading of the IMU and, therefore, of the body with which the IMU is associated. Signals from one or more accelerometers of the IMU also can be processed to obtain data including velocity and/or displacement of the IMU and, therefore, of the body with which the IMU is associated.

The term "VIO" (Visual-Inertial Odometry) is used herein to refer to a technique that combines data from an IMU and a camera to estimate the pose of an object in real time. The term "pose" refers to the position and orientation of the object, e.g., the three-dimensional position or translation (x, y, z) and orientation (yaw, pitch, roll), relative to a reference frame. A VIO system typically uses computer vision algorithms to analyze camera images and estimate the movement and position of the XR device, while also using IMU data to improve the accuracy and reliability of the estimates. By combining visual and inertial data, VIO may provide more robust and accurate tracking than using either sensor modality alone. In some examples, a VIO system may form part of a SLAM system, e.g., to perform the "Localization" function of the SLAM system.

The term "six degrees of freedom" (also referred to hereafter simply as a "6DOF") is used herein to refer to six degrees of freedom of movement. In the context of an XR device, 6DOF pose tracking may refer to the tracking of the pose of an object along three degrees of translational motion and three degrees of rotational motion.

Examples described herein provide tracking, data sharing, and/or data processing techniques that may be useful for XR devices. In some examples, two or more users each wear an XR device (e.g., a head-mounted XR device) and the XR devices share their 6DOF poses with each other. Where a user wears an XR device, the user can also be referred to as a "wearer."

Each XR device may utilize the shared poses from one or more other XR devices together with images to facilitate or improve tracking. For example, a first XR device may, during a pose sharing session, track the shared pose of a second XR device in the same environment (e.g., in the same room) while also capturing images of the wearer of the second XR device. This allows the first XR device to detect (e.g., identify) the wearer and keep track of its pose, even in cases where the wearer of the second XR device may exit the camera field of view of the first XR device.

According to some examples, a method performed by a first XR device that is worn by a first user includes establishing a communication link between the first XR device and a second XR device that is worn by a second user. The first XR device receives, via the communication link, pose data of the second XR device. The first XR device captures one or more images of the second user. The second user may then be identified based on the image and the pose data. In some examples, the pose of the second XR device may be projected onto the image (e.g., transformed to a two-dimensional (2D) position on the image) to enable the first XR device to link the pose to the second user as depicted in the image. The first XR device may match a projected position of the pose of the second XR device with a person appearing in the captured image to identify the second user.

Establishing the communication link may include establishing a pose sharing session that enables the first XR device to track the pose of the second XR device based on the pose data. The pose data may be updated during the pose sharing session to reflect changes in the pose of the second XR device over time.

In some examples, the first XR device and the second XR device are synchronized to establish a shared spatial reference system, e.g., a reference coordinate system. A spatial reference system (e.g., local coordinate system) of the first XR device can be aligned with a spatial reference system (e.g., local coordinate system) of the second XR device using different techniques, such as the scanning of a common marker, sharing of map data, or ego-motion alignment. A shared spatial reference system may be used, for example, to facilitate tracking of another XR device or to provide shared XR experience, e.g., a synchronized AR experience (e.g., an AR game) in which users of multiple XR devices see or interact with the same virtual content at the same time.

As mentioned, the first XR device may use the shared pose of the second XR device (e.g., its SLAM pose or VIO pose) to track the second XR device outside of the camera field of view of the first XR device. When the second user returns to a location that is inside of the camera field of view, the first XR device may again capture one or more images of the second user and match the one or more images with the tracked pose.

In some examples, responsive to identifying the second user based on the shared pose and the one or more images, the first XR device renders an augmentation with respect to the second user. For example, the first XR device may render an augmentation and present it to appear at least partially overlaid on the second user from a viewing perspective of a first user wearing the first XR device. The first XR device may render the augmentation uniquely for the second user, e.g., generate virtual content based on the specific features (e.g., landmarks) or pose of the second user. The first XR device may associate the augmentation with the second user, e.g., by storing a record of an association or link between the augmentation and the second user in memory.

Subsequent to an initial presentation of the augmentation on a display of the first XR device, the first XR device may determine (e.g., based on the tracked pose) that the second user has exited and re-entered the camera field of view of the XR device. The first XR device may then capture at least one further image of the second user and re-identify the second user by matching the tracked pose of the second XR device with the second user in the at least one further image. This enables the first XR device, for example, to identify or retrieve the augmentation that is associated with the second user and re-render the same augmentation with respect to the second user.

In some examples, more than two XR devices may share their poses with each other, e.g., via wireless links. For example, a first XR device, a second XR device, and a third XR device may each share their 6DOF pose data with the other two XR devices during a pose sharing session to improve or facilitate tracking. XR devices may also share other data with each other, such as landmark estimations, e.g., positions of landmarks on an object as detected by from the perspective of one of the XR devices.

According to some examples, a method includes establishing a first communication link between a first XR device and a second XR device and a second communication link between the first XR device and a third XR device. The first XR device receives shared pose data from the second XR device and the third XR device. The first XR device uses the pose data received from the second XR device, together with one or more images of a wearer of the second XR device, to generate a first landmark estimation for a detected body part of the wearer. For example, the first XR device may detect or estimate positions of a plurality of landmarks associated with different body parts of the wearer of the second XR device.

The first XR device receives a second landmark estimation generated by the third XR device, e.g., generated by the third XR device for the same body parts of the wearer of the second XR device from the perspective of the third XR device. The first XR device may then utilize the second landmark estimation and the pose data of the third XR device to adjust the first landmark estimation. Accordingly, an XR device implementing this technique may provide improved landmark estimations, tracking, or augmentation rendering.

Examples described herein may allow an XR device to leverage information generated by one or more other XR devices in the same environment to improve tracking, identification, or augmentations. For example, the XR device may generate more accurate body tracking predictions by using techniques described herein. Further, the technical problem of tracking being hindered when a tracked object leaves a camera field of view may be alleviated or addressed.

In some examples, techniques described herein may enable a first XR device to render and apply more consistent augmentations with respect to a wearer of a second XR device. Techniques described herein may also provide a privacy benefit in that the need to determine the identity of a person, e.g., by analyzing personal or biometric details such as facial features, is obviated or reduced.

In many cases, body tracking techniques utilized by XR devices rely primarily on image input. This may result in technical problems, such as inaccurate scale, particularly when relying on mono-image input, in turn resulting in inaccurate 3D body models and degrading user experience. Examples described herein may address or alleviate such problems by using external pose data to improve scale and 3D body models without significantly increasing computational cost. For example, where a user is wearing a first XR device as a head-mounted device, a second XR device may utilize the pose of the first XR device as a depth anchor landmark to optimize the scale of a body model or reduce reprojection error.

Further, AR devices commonly suffer from so-called "see-through latency," at least to some extent. The term "see-through latency" refers to a delay between real-world events and the corresponding changes in the AR display (e.g., augmentations) superimposed onto the real world. To overcome such latency, the AR device has to predict where a tracked object will be at a point in the future (e.g., in 20 ms, 30 ms, or 50 ms, depending on the delay) in an attempt to align rendered virtual content with reality. As mentioned above, XR devices (including AR devices) often rely primarily on image data to perform body tracking. Image data is often relatively noisy and can result in inaccurate predictions. Examples described herein may address or alleviate such problems by using external pose data to improve predictions. For example, a first XR device may use both its on-board sensor data, such as captured images and IMU data, as well as pose data shared by a second XR device, to accurately determine or estimate a trajectory of the second XR device, and thus of a wearer of the second XR device. A predicted pose of the second XR device, based on the determined or estimated trajectory, may be used as an anchor for predicted body positions or body poses, thereby improving accuracy of virtual content rendered with respect to the wearer of the second XR device.

According to some examples, the presently described methods may provide an improvement to an operation of the functioning of a computer by utilizing data external to an XR device to enhance real-time tracking capabilities. When the effects in this disclosure are considered in aggregate, one or more of the methodologies described herein may obviate a need for certain efforts or resources that otherwise would be involved. Computing resources used by one or more machines, databases, or networks may be more efficiently utilized or even reduced, e.g., as a result of more accurate determinations of landmarks, or by reducing processing requirements associated with re-identifying or re-detecting a user that has left and subsequently re-entered the field of view of an XR device. Examples of such computing resources may include processor cycles, network traffic, memory usage, graphics processing unit (GPU) resources, data storage capacity, power consumption, and cooling capacity.

FIG. 1 is a network diagram illustrating a network environment 100 suitable for operating an XR device 110, according to some examples. The network environment 100 includes an XR device 110 and a server 112, communicatively coupled to each other via a network 104. The server 112 may be part of a network-based system. For example, the network-based system may be or include a cloud-based server system that provides additional information, such as virtual content (e.g., three-dimensional models of virtual objects, or augmentations to be applied as virtual overlays onto images depicting real-world scenes) to the XR device 110.

A user 106 operates the XR device 110. The user 106 may be a human user (e.g., a human being), a machine user (e.g., a computer configured by a software program to interact with the XR device 110), or any suitable combination thereof (e.g., a human assisted by a machine or a machine supervised by a human). The user 106 is not part of the network environment 100, but is associated with the XR device 110.

The XR device 110 may be a computing device with a display such as a smartphone, a tablet computer, or a wearable computing device (e.g., watch or head-mounted device, such as glasses). As mentioned, where the XR device 110 is worn by the user 106 during operation, the user 106 can be referred to as a wearer. The computing device may be hand-held or may be removably mounted to a head of the user 106. In one example, the display may be a screen that displays what is captured with a camera of the XR device 110. In another example, the display of the device may be transparent or semi-transparent such as in lenses of wearable computing glasses. In other examples, the display may be a transparent display such as a windshield of a car, plane, truck. In another example, the display may be non-transparent and wearable by the user to cover the field of vision of the user.

The user 106 operates one or more applications of the XR device 110. The applications may include an AR application configured to provide the user 106 with an experience triggered or enhanced by a physical object 108, such as a two-dimensional physical object (e.g., a picture), a three-dimensional physical object (e.g., a statue or a person in the real-world environment 102), a location (e.g., a factory), or any references (e.g., perceived corners of walls or furniture, or Quick Response (QR) codes) in the real-world environment 102. For example, the user 106 may point a camera of the XR device 110 to capture an image of the physical object 108 and a virtual overlay may be presented over the physical object 108 via the display.

Certain experiences may also be triggered, enhanced, or controlled by a hand of the user 106. For example, the user 106 may perform certain gestures to control or interact with a user interface of the AR application. To allow the user 106 to interact with virtual objects, the XR device 110 may detect the positions and movements of one or both hands of the user 106 and use those hand positions and movements to determine the user's intentions in manipulating the virtual objects. In some examples, the interaction of a user with the AR application can be achieved using a 3D user interface.

The XR device 110 includes tracking components (not shown). The tracking components track the pose (e.g., position and orientation) of the XR device 110 relative to the real-world environment 102 using one or more of image sensors (e.g., depth-enabled 3D camera and image camera), inertial sensors (e.g., gyroscope, accelerometer, or the like), wireless sensors (e.g., Bluetooth™ or Wi-Fi), a Global Positioning System (GPS) sensor, or an audio sensor.

In some examples, the server 112 may be used to detect and identify the physical object 108 based on sensor data (e.g., image and depth data) from the XR device 110, determine a pose of the XR device 110 and the physical object 108 based on the sensor data. The server 112 can also generate a virtual object based on the pose of the XR device 110 and the physical object 108. The server 112 communicates the virtual object to the XR device 110. The XR device 110 or the server 112, or both, can also perform image processing, object detection and object tracking functions based on images captured by the XR device 110 and one or more parameters internal or external to the XR device 110. The object recognition, tracking, and virtual content rendering can be performed on either the XR device 110, the server 112, or a combination between the XR device 110 and the server 112.

Accordingly, while certain functions are described herein as being performed by either an XR device or a server, the location of certain functionality may be a design choice. For example, it may be technically preferable to deploy particular technology and functionality within a server system initially, but later to migrate this technology and functionality to a client installed locally at the XR device where the XR device has sufficient processing capacity.

The XR device 110 may also communicate with other XR devices. For example, the XR device 110 may establish a wireless connection with another XR device in the same real-world environment 102 and the two XR devices may share data (e.g., tracking information or messages) via the wireless connection. The XR device 110 may also be indirectly connected to another XR device, e.g., via the server 112.

The XR device 110 and the server 112 may each be implemented in a computer system, in whole or in part, as described below with respect to FIG. 13. Moreover, any two or more of the machines, components, or devices illustrated in FIG. 1 may be combined into a single machine, and the functions described herein for any single machine, database, or device may be subdivided among multiple machines, databases, or devices.

The network 104 may be any network that enables communication between or among machines (e.g., server 112), databases, and devices (e.g., XR device 110). Accordingly, the network 104 may be a wired network, a wireless network (e.g., a mobile or cellular network), or any suitable combination thereof. The network 104 may include one or more portions that constitute a private network, a public network (e.g., the Internet), or any suitable combination thereof.

Figure 2:
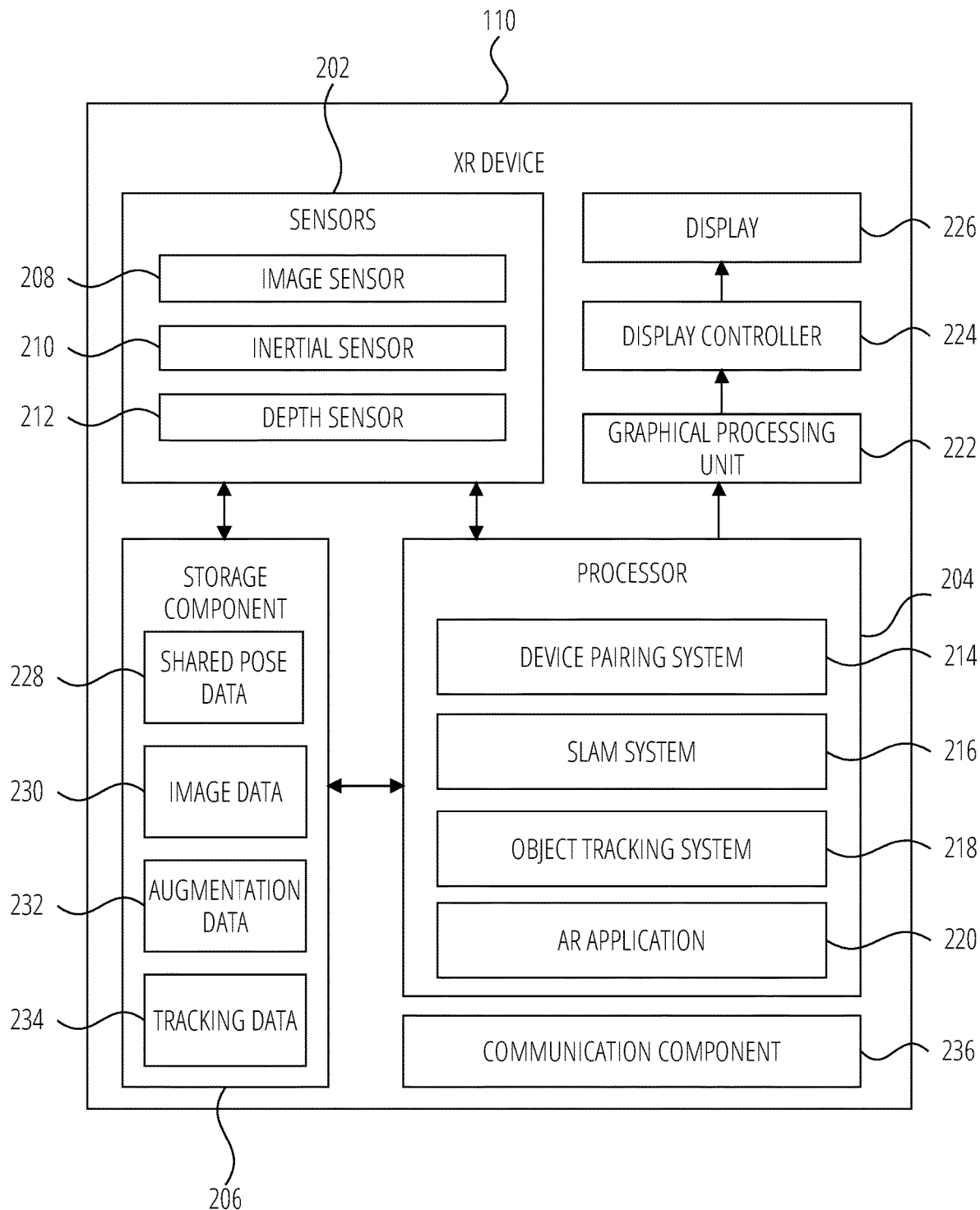
FIG. 2 is a block diagram illustrating components of an XR device, according to some examples.

FIG. 2 is a block diagram illustrating components of the XR device 110, according to some examples. The XR device 110 includes sensors 202, a processor 204, a storage component 206, a graphical processing unit 222, a display controller 224, and a display 226. It is noted that the components shown in FIG. 2 are for illustration purposes and possible components of an XR device are thus not limited to the ones depicted.

Figure 3:
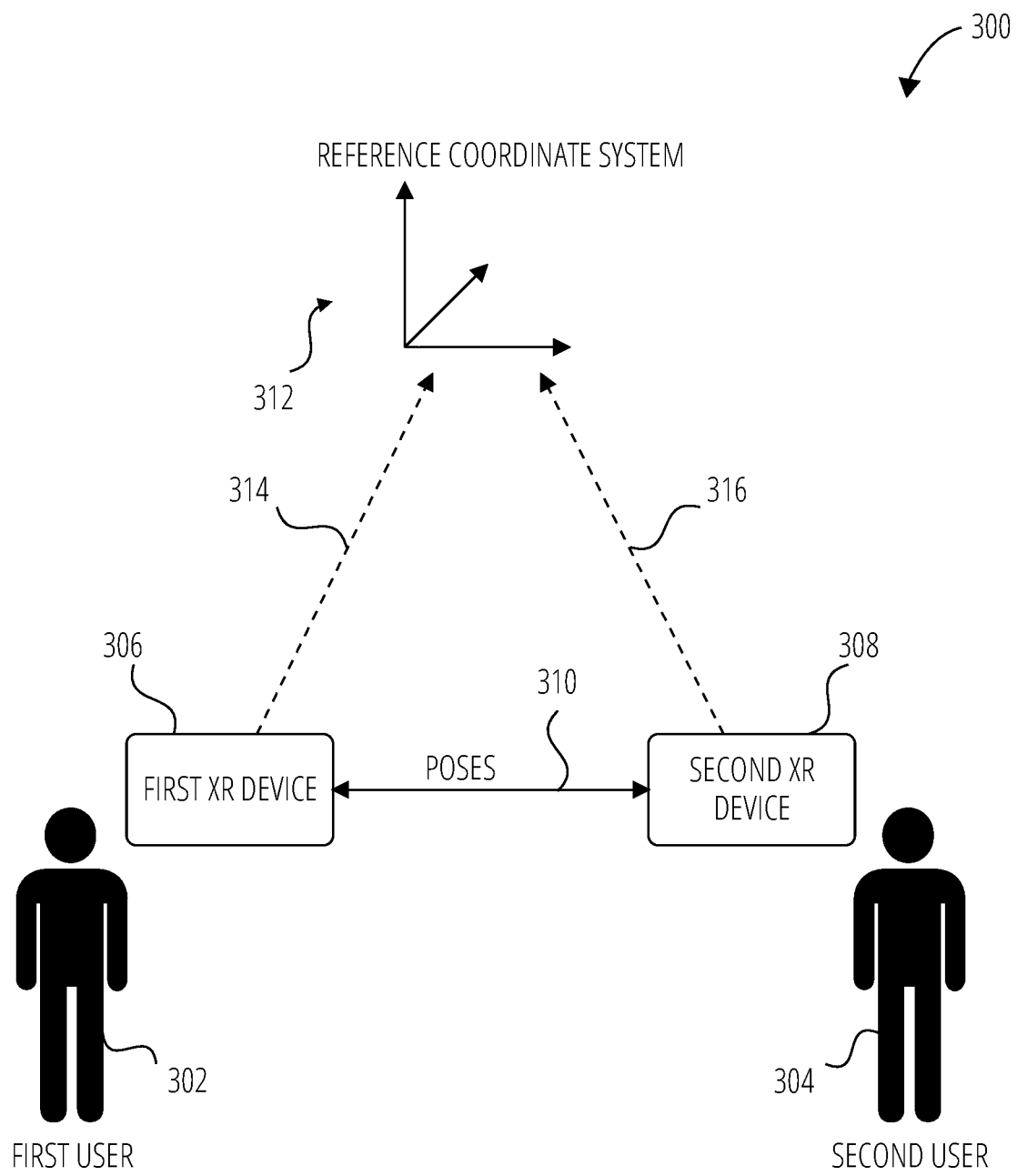
FIG. 3 is a diagrammatic illustration of a first user and a second user, each wearing an XR device, in which the XR devices establish a pose sharing session, according to some examples.
Figure 6:
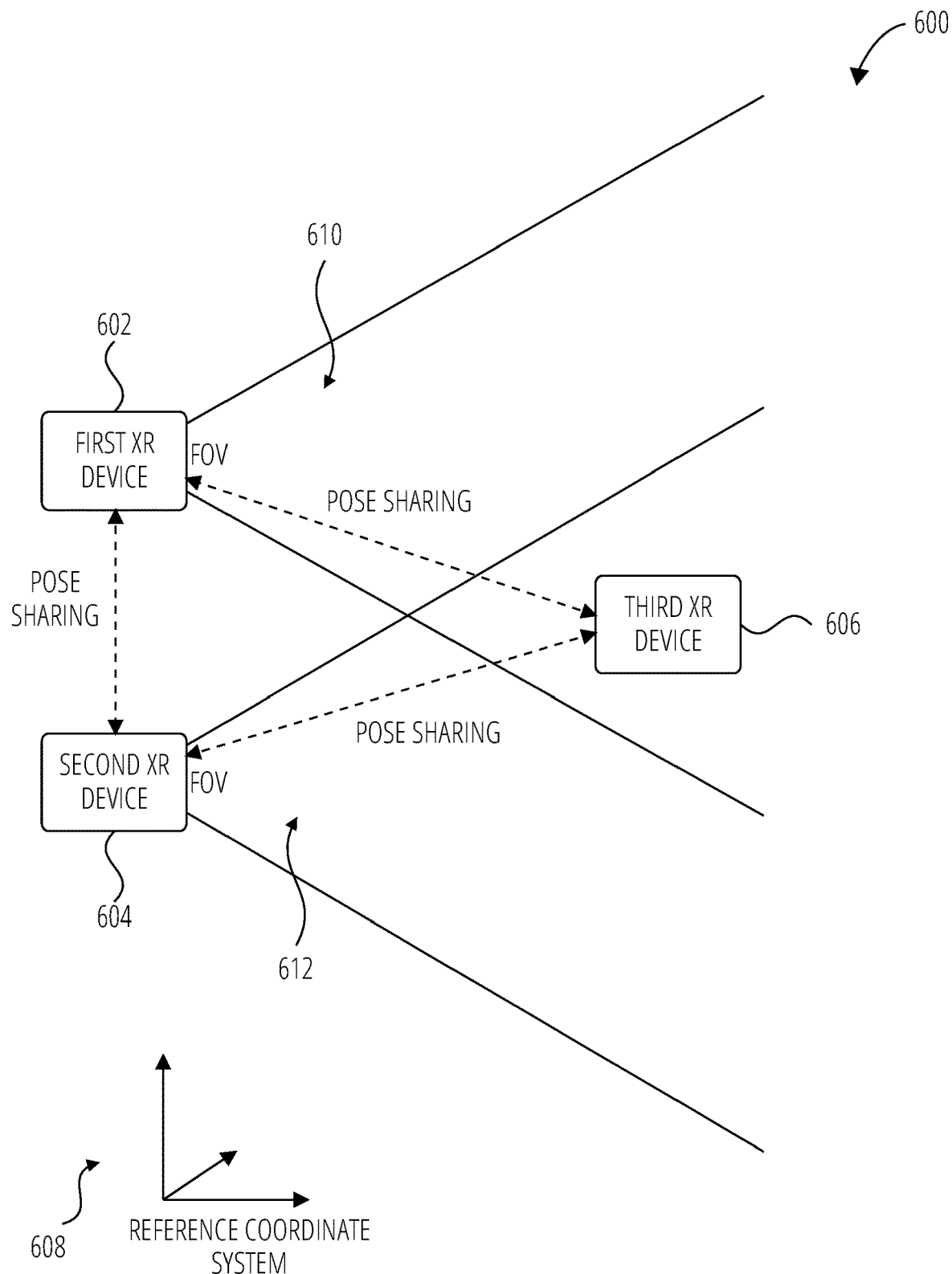
FIG. 6 is a diagrammatic illustration of three XR devices, in which the XR devices establish a pose sharing session, according to some examples.

Any one or more of the components described herein, e.g., in FIG. 2, FIG. 3, or FIG. 6, may be implemented using hardware (e.g., a processor of a machine) or a combination of hardware and software. For example, any component described herein may configure a processor to perform the operations described herein for that component. Moreover, any two or more of these components may be combined into a single component, and the functions described herein for a single component may be subdivided among multiple components. Furthermore, according to various examples, components described herein as being implemented within a single machine, database, or device may be distributed across multiple machines, databases, or devices.

The XR device 110 detects and identifies features of the real-world environment 102, or the physical object 108, e.g., using computer vision, and enables a user of the XR device 110 to experience virtual content, e.g., augmentations overlaid onto objects in the real world. Various sensors 202 are used by the XR device 110. The sensors 202 include an image sensor 208, an inertial sensor 210, and a depth sensor 212 (it will be appreciated, however, that multiple image sensors, multiple inertial sensors, or multiple depth sensors may form part of the sensors 202).

The image sensor 208 may include one or a combination of a color camera, a thermal camera, a depth sensor, and one or multiple grayscale, global shutter tracking cameras. The inertial sensor 210 may be an IMU that includes a combination of a gyroscope, accelerometer, and a magnetometer. The depth sensor 212 may include one or a combination of a structured-light sensor, a time-of-flight sensor, passive stereo sensor, and an ultrasound device. Other examples of sensors 202 include a proximity or location sensor (e.g., near field communication, GPS, Bluetooth™, or Wi-Fi), an audio sensor (e.g., a microphone), or any suitable combination thereof. It is noted that the sensors 202 described herein are for illustration purposes and the sensors 202 are thus not limited to the ones described above.

The processor 204 implements or executes a device pairing system 214, a SLAM system 216, an object tracking system 218, and an AR application 220. Referring firstly to the device pairing system 214, the XR device 110 is enabled to pair with one or more other computing devices, including one or more other XR devices in the same real-world environment 102 (e.g., in the same room, in a parking lot, or in a park). The XR device 110 may include a communication component 236, e.g., a Bluetooth™ chip or Wi-Fi module, that allows the XR device 110 to establish a communication link and communicate with another XR device. Such a communication link may allow multiple devices to connect, e.g., by establishing a shared session via a shared spatial reference system, to share tracking data, such as pose information, and thereby improve tracking capabilities of the devices, as described further below.

The SLAM system 216 estimates a pose of the XR device 110 and continuously updates the estimated pose. For example, the SLAM system 216 uses image data from the image sensor 208 and inertial data from the inertial sensor 210 to track a location or pose of the XR device 110 relative to a frame of reference (e.g., real-world environment 102 as shown in FIG. 1 or a common marker). The SLAM system 216 may use images of the user's real-world environment 102, as well as other sensor data to identify a relative position and orientation of the XR device 110 from physical objects in the real-world environment 102 surrounding the XR device 110. In some examples, the SLAM system 216 uses the sensor data to determine the 6DOF pose of the XR device 110.

The SLAM system 216 may be used to build a map of the real-world environment and to locate the XR device 110 within the real world. The SLAM system 216 may estimate and continuously track a pose of the XR device 110. This facilitates, for example, accurate placement of virtual content overlaid, or superimposed, on the real world and tracking of their position as a user moves and/or as objects move.

The XR device 110 may include a VIO system that combines data from the inertial sensor 210 and the image sensors 208 to estimate the position and orientation of an object in real-time. In some examples, a VIO system may form part of the SLAM system 216, e.g., to perform the "Localization" function of the SLAM system 216. The SLAM system 216 may provide the pose of the XR device 110 to the graphical processing unit 222.

In use, in some examples, the SLAM system 216 continually gathers and uses updated sensor data describing movements of the XR device 110, and other features (e.g., visual features), to determine updated poses of the XR device 110 that indicate changes in the relative position and orientation of the XR device 110 from the physical objects in the real-world environment 102.

The object tracking system 218 enables the detection and tracking of an object, e.g., the physical object 108 (which may be a person), or a hand of the user of the XR device 110. The object tracking system 218 may include a computer-operated application or system that enables a device or system to detect and track visual features identified in images captured by the image sensors 208. In some examples, the object tracking system 218 works with the SLAM system 216 to build a model of a real-world environment based on the tracked visual features. The object tracking system 218 may implement one or more object tracking machine learning models to track an object, e.g., an object traveling in the field of view of a user during a user session.

During operation, the image sensor 208 captures video frames of the real-world environment 102. The frames are then processed by the object tracking system 218 to extract visual features or other information using one or more computer vision techniques. Examples of such techniques include template matching, edge detection, and feature point extraction. In some examples, the image sensor 208 may include multiple cameras arranged to increase an overall field of view and provide overlapping coverage. The object tracking system 218 may employ stereo matching techniques to facilitate or provide depth estimation.

The object tracking system 218 may implement two phases of object tracking: a detection phase in which the object of interest (e.g., a person in the camera field of view) is identified, and a tracking phase in which the pose of the object is tracked over a period of time. Various algorithms, including algorithms implemented by object tracking machine learning models as mentioned above, may be used to predict or estimate the movement or pose of the object and to update the pose of the object over time.

Examples described herein provide for the object tracking system 218 and/or the SLAM system 216 to receive tracking information, such as pose data or landmark information, from another XR device that is connected to the XR device 110, e.g., using the communication component 236 and the device pairing system 214. The object tracking system 218 and/or the SLAM system 216 may then use the tracking information to enhance or enrich its tracking functions, or to enable tracking of objects that would otherwise be challenging or even impossible to track with a satisfactory degree of accuracy. Aspects of the sharing of tracking information with an XR device are described in greater detail below, with reference to the examples of FIGS. 3-7.

The AR application 220 communicates with the SLAM system 216 and/or object tracking system 218 to provide an AR experience. The AR application 220 may retrieve a virtual object (e.g., three-dimensional object model) based on an identified physical object 108 or physical environment, or retrieve an augmentation to apply to the physical object 108. The AR application 220 may obtain or generate a visualization of a virtual object overlaid (e.g., superimposed upon, or otherwise displayed in tandem with) on an image of the physical object 108 captured by the image sensor 208. A visualization of the virtual object may be manipulated by adjusting a position of the physical object 108 (e.g., its physical location, orientation, or both) relative to the image sensor 208. Similarly, the visualization of the virtual object may be manipulated by adjusting a pose of the XR device 110 relative to the physical object 108.

As mentioned, the AR application 220 retrieves virtual content to be displayed to the user. The graphical processing unit 222 may include a render engine (not shown) that is configured to render a frame of a three-dimensional model of a virtual object based on the virtual content provided by the AR application 220 and the pose of the XR device 110 (e.g., relative to an object upon which virtual content is to be overlaid). In other words, the graphical processing unit 222 uses the pose of the XR device 110 to generate frames of virtual content to be presented on the display 226. For example, the graphical processing unit 222 uses the pose to render a frame of the virtual content such that the virtual content is presented at an orientation and position in the display 226 to properly augment the user's reality. As an example, the graphical processing unit 222 may use the pose data to render a frame of virtual content such that, when presented on the display 226, the virtual content overlaps with a physical object in the user's real-world environment 102. For instance, when the virtual content is presented on the display 226, the user may see the virtual content as an augmentation applied to or over a body of another person in the field of view of the user. The graphical processing unit 222 can generate updated frames of virtual content based on updated poses of the XR device 110, which reflect changes in the position and orientation of the user in relation to physical objects in the user's real-world environment 102, thereby resulting in a better, e.g., more immersive or convincing, experience.

The graphical processing unit 222 transfers the rendered frame to the display controller 224. The display controller 224 is positioned as an intermediary between the graphical processing unit 222 and the display 226, receives the image data (e.g., rendered frame) from the graphical processing unit 222, re-projects the frame (e.g., by performing a warping process) based on a latest pose of the XR device 110 (and, in some cases, pose forecasts or predictions), and provides the re-projected frame to the display 226.

The display 226 includes a screen or monitor configured to display images generated by the processor 204. In some examples, the display 226 may be transparent or semi-transparent so that the user 106 can see through the display 226 (in AR use cases). In another example, the display 226, such as a LCOS (Liquid Crystal on Silicon) display, presents each frame of virtual content in multiple presentations. It will be appreciated that an XR device may include multiple displays, e.g., in the case of AR glasses, a left eye display and a right eye display. A left eye display may be associated with a left lateral side camera, with frames captured by the left lateral side camera being processed specifically for the left eye display. Likewise, the right eye display may be associated with a right lateral side camera, with frames captured by the right lateral side camera being processed specifically for the right eye display. It will be appreciated that, in examples where an XR device includes multiple displays, each display may have a dedicated graphical processing unit and/or display controller.

The storage component 206 may store various data, such as shared pose data 228, image data 230, augmentation data 232, and tracking data 234. The shared pose data 228 includes, for example, pose data received from one or more other XR devices during a pose sharing session. The image data 230 may include one or more images (e.g., frames) captured by the image sensor 208, or processed image data (e.g., bounding box data). The augmentation data 232 may include details of augmentations, e.g., augmentations rendered during a current user session with respect to a particular object, e.g., a person. The storage component 206 may store an association between a rendered augmentation and a particular object, e.g., "Augmentation ABC applied to Object DEF" or "Augmentation GHJ applied to Person XYZ." The tracking data 234 includes, for example, data to which computer vision algorithms have been applied to generate detections or predictions. The tracking data 234 can also include, for example, measurement data of the inertial sensor 210, such as accelerometer measurements, gyroscope measurements, magnetometer measurements, and/or temperature measurements, or data from other sensors such as the depth sensor 212.

It will be appreciated that, where an XR device includes multiple displays, steps may be carried out separately and substantially in parallel for each display, in some examples. For example, an XR device may capture separate images for a left eye display and a right eye display, and separate outputs for each eye to create a more immersive experience and to adjust the focus and convergence of the overall view of a user for a more natural, three-dimensional view. Thus, while a single camera and a single output display may be discussed to describe some examples, similar techniques may be applied in devices including multiple cameras and multiple displays.

FIG. 3 is a diagram 300 showing a first user 302 and a second user 304. The first user 302 wears a first XR device 306 and the second user 304 wears a second XR device 308. In FIG. 3, the first XR device 306 and the second XR device 308 are both head-mounted devices that include components such as those of the XR device 110 of FIG. 1 and FIG. 2. Accordingly, by way of example and not limitation, the diagram 300 is described with reference to components of the XR device 110. However, it will be appreciated that aspects of the present disclosure may be implemented using other types of XR devices.

The first XR device 306 establishes a communication link 310 with the second XR device 308 to enable the first XR device 306 and the second XR device 308 to share data with each other. As will be described further below, the data may include pose data (e.g., the devices may share their 6DOF poses with each other, together with timestamps, over a period of time). A user session, or part thereof, during which the first XR device 306 receives pose data from the second XR device 308 and/or sends pose data to the second XR device 308 can be referred to as a pose sharing session.

The first XR device 306 and the second XR device 308 establish a synchronized spatial reference system in the form of reference coordinate system 312. For example, the first XR device 306 performs an alignment operation 314 to align its local coordinate system with the reference coordinate system 312, and the second XR device 308 also performs an alignment operation 316 to align its local coordinate system with the reference coordinate system 312.

Different techniques may be used to align a spatial reference system of the first XR device 306 with a spatial reference system of the second XR device 308. For example, the first XR device 306 and the second XR device 308 may scan a common marker. In such cases, both the first XR device 306 and the second XR device 308 may recognize a reference point in the real-world environment 102 (e.g., via a camera and/or other sensor) and align their respective coordinate systems to the reference point (defining the reference coordinate system 312). As another example, where both the first XR device 306 and the second XR device 308 use a SLAM system, such as the SLAM system 216, in the same real-world environment 102, they can share and align their maps to create the reference coordinate system 312.

In some examples, the first XR device 306 and the second XR device 308 perform ego-motion alignment to align their spatial reference systems. Ego-motion alignment may be performed as follows. Each XR device 306, 308 receives the pose of the other XR device and also captures images of the other user, e.g., the first XR device 306 tracks the face of the second user 304 and the second XR device 308 tracks the face of the first user 302.

In the case of the first XR device 306, a minimum requirement may be that the first XR device 306 observes the face of the second user 304. In other words, the second XR device 308 need not necessarily have to observe the face of the first user 302 for the first XR device 306 to perform ego-motion alignment. Still referring to the case of the first XR device 306, the tracked pose of the second XR device 308 provides a pose trajectory of the second XR device 308 and, together with the captured observations that provide corresponding positions of the second user 304, it is possible to determine the alignment transformation that is required to align the pose trajectory of the first XR device 306 with the pose trajectory of the second XR device 308, and thus the two different coordinate systems. For example, the alignment transformation may be a transformation that transforms the local coordinate system of the second XR device 308 to match the local coordinate system of the first XR device 306, in which case the reference coordinate system 312 may be the local coordinate system of the first XR device 306.

Different methods may be used to determine the alignment transformation when performing ego-motion alignment. Each XR device 306, 308 may run a face detector (e.g., as part of the object tracking system 218) that tracks the face of the other user. The face detector may utilize a suitable computer vision algorithm, such as an eigen face technique. Each XR device 306, 308 may also run a pose tracker, such as a VIO pose tracker, and the pose trackers of the XR devices 306, 308 may be gravity aligned. Gravitational alignment may be determined by the inertial sensor 210 (e.g., IMU). This means that one of their coordinate axes (e.g., the z-coordinate) is oriented towards the earth's center. Remaining rotational ambiguity to be estimated may thus be one-dimensional, meaning that only one angle is needed to be estimated for the orientation part of the alignment transformation. For the translation part, three values (x, y, z), thus four in total, need to be estimated. Processing may be performed at one of the XR devices 306, 308 or at a server, e.g., the server 112.

In one type of ego-motion alignment, each XR device 306, 308 may run the face detector and track a fixed point on a symmetry plane of the face of the other user, and its (x, y) coordinates in each captured image or frame is output and processed. In this case, there may be an additional unknown, being a distance of the inertial sensor 210 to the fixed point, e.g., the distance from the nose of the second user 304 to the IMU of the second XR device 308. The (x, y) coordinates together with the shared pose data make the alignment problem solvable.

In another type of ego-motion alignment, each XR device 306, 308 uses face detection to generate a bounding box of the face of the other user in the captured images and to initialize an XR device tracker. A full 3D model of the XR device may be known and stored in memory of the first XR device 306. In such cases, the first XR device 306, for example, may track a fixed point on the second XR device 308 itself (e.g., (x, y) coordinates thereof), instead of a point on the face of the second user 304. This eliminates the additional unknown mentioned above. However, in both cases the alignment problem may be solvable by capturing images and tracking the position of the fixed point over time, together with the gravity-aligned poses.

A processor (e.g., the processor 204) may use the pose data and tracked (x, y) coordinates to build matrices to arrive at a Quadratic Eigenvalue Problem (QEP). The processor may implement a suitable solver for determining the relevant alignment transformation, e.g., to determine 4 points (in the case of face feature tracking) or 3 points (in the case of XR device tracking). The output may be a yaw-angle difference and a 3D translation of the alignment transformation.

The clocks of the first XR device 306 and the second XR device 308 may also be synchronized, e.g., by using Network Time Protocol (NTP) or by using interaction or signals between the first user 302 and the second user 304. Various types of interactions or signals may be monitored to determine a time difference, or time offset, between the respective clocks of the first XR device 306 and the second XR device 308.

For example, a "wave-to-sync" operation may be performed to perform time synchronization. In the "wave-to-sync" operation, the first user 302 may wave their arm in the camera field of view of both the first XR device 306 and the second XR device 308 (e.g., while the second user 304 is looking at the first user 302). The first XR device 306 and the second XR device 308 then each captures the waving motion, e.g., by plotting or otherwise recording the angle of the arm over time, or the position of the hand over time, from the perspective of that particular XR device 306, 308. The differences in the captured signals may then be analyzed to determine the time offset, e.g., by one of the XR devices 306, 308 or by a server.

For example, the second XR device 308 may share the captured signal representing the angle of the arm over time with the first XR device 306 to enable the first XR device 306 to determine the time offset between the two captured signals (or vice versa). Once the time offset has been determined, the clocks of the first XR device 306 and the second XR device 308 can be synchronized to ensure that the pose data of the devices correspond temporally.

The establishment of a shared and synchronized spatial reference system may make the data shared between the first XR device 306 and the second XR device 308 more useful, e.g., by allowing the first XR device 306 to understand the exact pose of the second XR device 308 with reference to the reference coordinate system 312 (e.g., as opposed to simply receive the pose of the second XR device 308, but not being able to relate the pose of the second XR device 308 accurately to the pose of the first XR device 306).

Figure 4:
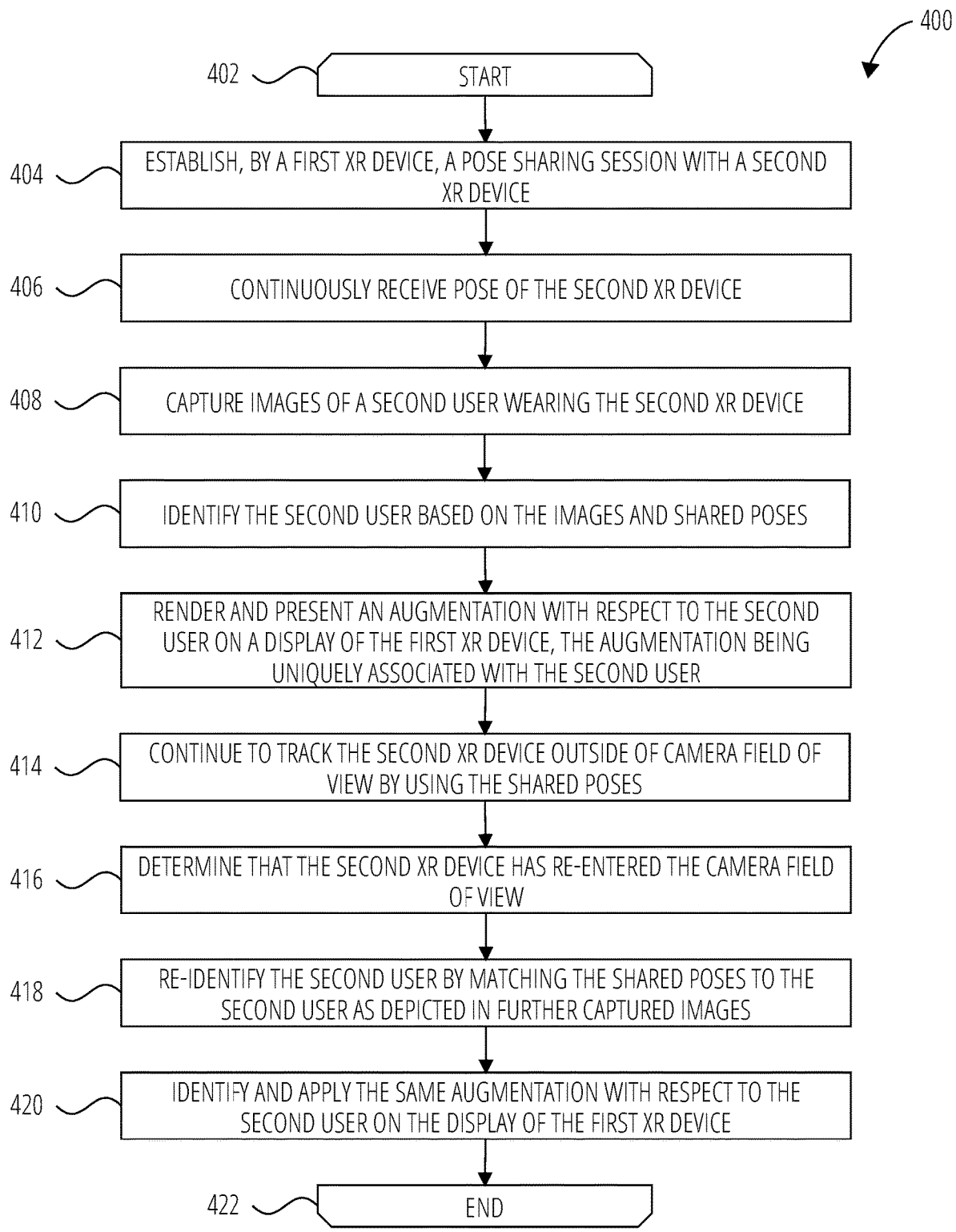
FIG. 4 is a flowchart illustrating a method suitable for tracking a user of an XR device and applying an augmentation with respect to the user, according to some examples.

FIG. 4 is a flowchart illustrating a method 400 suitable for tracking a user of an XR device and applying an augmentation with respect to the user, according to some examples. Operations in the method 400 may be performed by the first XR device 306 and the second XR device 308 of FIG. 3. Accordingly, the method 400 is described by way of example (and not limitation) with reference to the first XR device 306 and the second XR device 308 of FIG. 3.

The method 400 commences at opening loop element 402 and proceeds to operation 404, wherein the first XR device 306 establishes a pose sharing session with the second XR device 308. As described with reference to FIG. 3, the first XR device 306 and the second XR device 308 may establish the communication link 310, e.g., via their respective device pairing systems 214, to enable the wireless sharing of data via the communication link 310. Further, the first XR device 306 and the second XR device 308 may establish a shared spatial reference system, e.g., the reference coordinate system 312.

The first XR device 306 then (during the pose sharing session) receives pose data from the second XR device 308, e.g., the first XR device 306 may receive 6DOF poses together with timestamps at a predetermined frequency (operation 406). The 6DOF poses may, for example, be SLAM poses or VIO poses as generated by the SLAM system 216 of the second XR device 308. This enables the first XR device 306 to track the pose of the second XR device 308 and to follow a trajectory of the second XR device 308, as also described with reference to FIG. 5 below.

At operation 408, the first XR device 306 captures images of the second user 304 (the wearer of the second XR device 308). The first XR device 306 is able to identify the second user 304 based on the captured images and the shared poses (operation 410). For example, the object tracking system 218 of the first XR device 306 may project the pose of the second XR device 308 at a particular point in time onto an image captured at the same (or approximately the same) point in time, e.g., by projecting the 3D position of the second XR device 308 onto the image to obtain a 2D projected position.

The method 400 proceeds to operation 410, where the first XR device 306 identifies the second user 304 by matching the projected pose data (e.g., the 2D projected position) with the second user 304 in the image. It is noted that matching may be performed over a plurality of images and corresponding poses to accurately identify the second user 304. The first XR device 306 may estimate or detect landmarks of the second user 304, e.g., use the images and corresponding poses to detect or track body parts, such as shoulders, hips, and knees, or predefined landmark points on the second XR device 308 worn by the second user 304. Further details regarding landmark estimation are provided below.

Once the second user 304 has been identified, at operation 412, the first XR device 306 renders an augmentation and presents the augmentation on the display 226 of the first XR device 306 such that it appears overlaid on the second user 304. For example, the first XR device 306 may render a virtual shirt that appears to be overlaid onto the body of the second user 304 in the real-world environment 102, or render a face filter (also referred to as a "lens") that modifies the appearance of the second user 304 from the perspective of the first user 302. By tracking the pose of the second XR device 308 to follow the trajectory of the second user 304, the first XR device 306 may be able to apply the augmentation in the correct position while second user 304 moves in the real-world environment 102, e.g., more accurately than would be the case if using captured images alone. As alluded to above, this may also enable the first XR device 306 to perform more accurate or precise landmark detection or landmark estimation.

In some examples, the augmentation rendered at operation 412 is uniquely associated with the second user 304. For example, the augmentation may be specifically rendered for the second user 304 and applied to match features of the second user 304. For instance, the first XR device 306 may generate a custom augmentation, or a customized version of a template augmentation, such that the augmentation "fits" predetermined landmarks on the body of the second user 304. Accordingly, the first XR device 306 may store an association between the augmentation and the second user 304.

The first XR device 306 continues to track the second XR device 308. At operation 414, the second XR device 308 disappears from the camera field of view of the first XR device 306. The first XR device 306 may detect that the second XR device 308 has left the camera field of view by checking captured images (e.g., frames) and the tracked pose of the second XR device 308. However, the first XR device 306 is still able to track the pose or trajectory of the first XR device 306 (and thus the second user 304) by using the shared poses. In other words, while the first XR device 306 no longer renders the augmentation (as the second user 304 has exited the field of view of the first user 302) it continues to track the second XR device 308.

At operation 416, the first XR device 306 determines that the second XR device 308 has re-entered the camera field of view of the first XR device 306. Again, this may be determined by checking the tracked pose of the second XR device 308. The first XR device 306 is then able to re-identify, or confirm the identity of, the second user 304 by matching the shared poses of the second XR device 308 with further images that are captured after the second user 304 re-enters the camera field of view (operation 418). Again, the first XR device 306 may utilize a 2D projected position based on the pose of the second XR device 308 to confirm that the second user 304, as depicted in one or more images, corresponds to the position of the second XR device 308 that is worn by the second user 304.

The first XR device 306 then retrieves and applies the same augmentation with respect to the second user 304 (operation 420). For example, the first XR device 306 may, once the second user 304 has been identified as described above, identify the stored augmentation associated with the second user 304 and generate the same virtual content (with adjustments that may be needed to compensate for changes in the relative pose of the first XR device 306 and the second XR device 308). The first XR device 306 may, for instance, render the same virtual shirt or the same face filter overlaid on the second user 304 once the second user 304 re-enters the camera field of view. The method 400 ends at closing loop element 422.

In this way, the first XR device 306 may be enabled to provide improved detection quality and to render more consistent augmentations. The first XR device 306 may also be able to render augmentations faster and/or using less processing resources, e.g., as a result of being able to use the tracked pose of the second XR device 308 to facilitate detection or location of the second user 304 in the camera field of view. Further, the first XR device 306 may retrieve the custom or customized augmentation that already matches the specific user, thereby accelerating the application of the augmentation and reducing a processing load.

In some examples, the use of shared pose data enables the first XR device 306 to track the second XR device 308 and/or the second user 304 with higher accuracy or to make more accurate predictions as to the pose or trajectory of the second XR device 308. Machine learning techniques may be applied to facilitate tracking, e.g., to provide more accurate body tracking results. For example, the shared pose data together with captured images (depicting the second user 304) may be fed into a neural network that is trained to handle both pose data and image data simultaneously and to output predictions, such as body tracking predictions to facilitate the rendering or positioning of augmentations.

Figure 5:
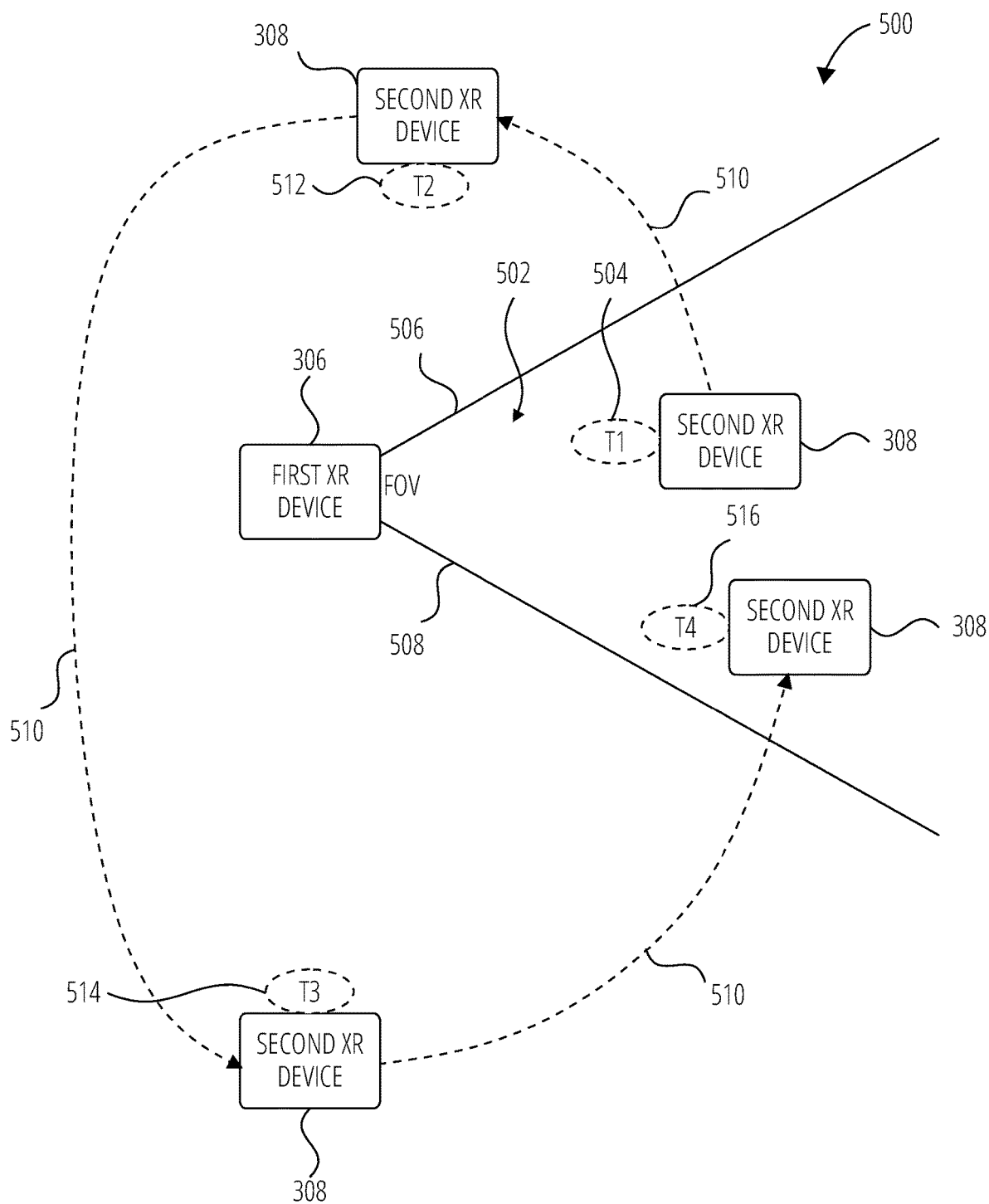
FIG. 5 is a diagrammatic illustration of a first XR device and a second XR device, in which the first XR device tracks a trajectory of the second XR device, showing positions of the second XR device at different points in time, according to some examples.

FIG. 5 shows a diagram 500 of the first XR device 306 and the second XR device 308 and illustrates a trajectory 510 of the second XR device 308, according to some examples. At a first point in time 504 (marked as "T1" in FIG. 5), the second XR device 308 is inside of a camera field of view 502 of the first XR device 306, as illustrated by the second XR device 308 being positioned between one edge of camera field of view 506 and another edge of camera field of view 508.

At the first point in time 504, the first XR device 306 and the second XR device 308 pair (e.g., establish a pose sharing session) and synchronize or align their coordinate systems. The first XR device 306 receives the pose of the second XR device 308 and captures images of the second user 304 who is wearing the second XR device 308.

The shared pose of the second XR device 308, e.g., the pose at "T1," is projected on a corresponding image of the second user 304, allowing the first XR device 306 to identify the second user 304 in the image. This may be repeated for multiple image and pose pairs. As described above, the first XR device 306 may then render an augmentation with respect to the second user 304 that is uniquely generated for and associated with the second user 304.

The first XR device 306 continues to track the pose of the second XR device 308 and thus the trajectory 510 of the second XR device 308, as shown in FIG. 5. At a second point in time 512 (marked as "T2" in FIG. 5) the second XR device 308 is outside of the camera field of view 502 of the first XR device 306. The second XR device 308 continues to move relative to the first XR device 306 along the trajectory 510 shown in FIG. 5. At a third point in time 514 (marked as "T3" in FIG. 5) the second XR device 308 remains outside of the camera field of view 502.

At the second point in time 512 and the third point in time 514, the first XR device 306 continues to receive the pose data from the second XR device 308 to enable it to keep track of the pose of the second XR device 308. However, as the second XR device 308 (and thus also the second user 304) is outside of the camera field of view 502, no image processing relating to the second user 304 is performed at the second point in time 512 and the third point in time 514. The first XR device 306 may determine that no such image processing is required based on the tracked position of the second XR device 308. It will be appreciated that the first XR device 306 may continue to capture frames at the second point in time 512 and the third point in time 514, e.g., to perform other functions of the first XR device 306, but may simply not attempt to detect the second user 304 in those frames.

The second user 304 then re-enters the camera field of view 502 of the first XR device 306. At a fourth point in time 516 (marked as "T4" in FIG. 5) the second user 304 and the second XR device 308 are visible in the camera field of view 502. Given that the first XR device 306 is still tracking the pose of the second XR device 308, the first XR device 306 detects that the second user 304 has re-entered the camera field of view 502 and re-commences processing captured images (e.g., frames) to identify or detect the second user 304 again. For example, the first XR device 306 may project the pose of the second XR device 308 at "T4" on the corresponding frame and match the pose with the person (second user 304) shown in the frame at that position. This allows the first XR device 306 to re-identify the second user 304.

In some examples, the first XR device 306 may predict, based on the tracked pose of the second XR device 308, that the second user 304 will re-enter the camera field of view 502 at a certain point in time, and initiate image processing at the point in time, based on the prediction. This may allow for quicker object detection and, in turn, quicker augmentation presentation.

The first XR device 306 identifies that the person identified in the frame is the same person to which a particular augmentation was applied earlier during the pose sharing session. The first XR device 306 may thus retrieve and re-apply the same, unique augmentation to the second user 304. By tracking the shared pose of the second XR device 308, the first XR device 306 may be able to predict, with greater accuracy, where certain landmarks (e.g., body parts) of the second user 304 will be, and thus render higher quality or better positioned augmentations.

As mentioned above, body tracking techniques utilized by XR devices often rely primarily on image input. This may result in technical problems, such as inaccurate scale, particularly when relying on mono image input, in turn resulting in inaccurate 3D body models and degrading user experience. By using external pose data, e.g., the use of the poses of the second XR device 308 by the first XR device 306, the first XR device 306 may be able to improve scaling and body models.

Further, and as also mentioned above, examples described herein may facilitate overcoming of, or at least ameliorate, see-through latency. For example, the use of the poses of the second XR device 308 by the first XR device 306 may allow the first XR device 306 to predict future poses more accurately or estimate the trajectory 510 of the second XR device 308. A predicted pose of the second XR device 308 may be used as an anchor for predicted body positions or body poses, thereby improving accuracy of virtual content rendered with respect to the wearer of the second XR device 308, e.g., a virtual overlay presented with respect to body parts of the wearer of the second XR device 308.

FIG. 6 is a diagram 600 showing a first XR device 602, a second XR device 604, and a third XR device 606. In FIG. 6, the first XR device 602, the second XR device 604, and the third XR device 606 are head-mounted devices that each include components such as those of the XR device 110 of FIG. 1 and FIG. 2. Accordingly, by way of example and not limitation, the diagram 600 is described with reference to components of the XR device 110. However, it will be appreciated that aspects of the present disclosure may be implemented using other types of XR devices.

The first XR device 602, the second XR device 604, and the third XR device 606 each pair with the other two XR devices to enable pose sharing, as depicted in FIG. 6. In other words, the first XR device 602 receives shared poses from the second XR device 604 and the third XR device 606, the second XR device 604 receives shared poses from the third XR device 606 and the first XR device 602, and the third XR device 606 receives shared poses from the first XR device 602 and the second XR device 604. As described further below, the first XR device 602 and the second XR device 604 may also share landmark-related data with each other to improve body detection or tracking. Pairing may be performed via suitable communication links, e.g., similar to the communication link 310 described with reference to FIG. 3.

In FIG. 6, the first XR device 602, the second XR device 604, and the third XR device 606 establish a shared and synchronized reference coordinate system 608. The XR devices 602, 604, and 606 may align with the reference coordinate system 608 and perform time synchronization, for example, as described with reference to FIG. 3.

The first XR device 602 may capture images of the wearer of third XR device 606 while the third XR device 606 is in a camera field of view 610 of the first XR device 602, and the second XR device 604 may also capture images of the wearer of the third XR device 606 while the third XR device 606 is in a camera field of view 612 of the second XR device 604. The first XR device 602 and the second XR device 604 may then each generate landmark estimations, or perform landmark detection, with respect to a body of the wearer of the third XR device 606.

Examples described herein allow for the first XR device 602 to generate adjusted landmark estimations with respect to the wearer of the third XR device 606 by using the shared poses and landmark estimations generated by the second XR device 604. This is described with reference to examples and FIG. 7 below.

Referring more generally to landmark estimation, in the context of XR, landmark estimation refers to the identification, detection, or estimation of specific points on a detected object, such as significant points on a human body. For example, landmarks may denote distinguishable anatomical features, such as joints, extremities, or facial elements, which can be harnessed for detection, tracking, processing, augmentation rendering, and so forth. In some examples, where an XR device is worn by a wearer, landmarks may include one or more points or positions on the XR device itself.

The object tracking system 218 of the XR device 110 may be configured to employ sensor data together with computer vision algorithms or deep learning models to identify, isolate, or track key landmarks. For instance, in a human body model, potential landmarks may include one or more of: shoulder, elbow, wrist, hip, knee, and ankle joints. The precise choice of landmarks may be determined by the intended application, implementation, or use case.

In some examples, the object tracking system 218 utilizes machine learning algorithms, such as convolutional neural networks (CNNs), that have been trained on datasets annotated with the respective landmarks. By receiving input images with body features, a machine learning model may output a set of probable landmark positions, which may be refined through successive network layers, other algorithms, or both.

In some examples, the object tracking system 218 may, in addition to detecting or estimating landmarks, also track the movement of landmarks (e.g., the pose of the landmarks). The object tracking system 218 may track landmarks across successive video frames, e.g., by applying a predictive model.

Landmarks estimations may be used by the XR device 110 to render suitable augmentations. For example, the AR application 220 may cause a body of a person in the camera field of view to be overlaid with virtual content that conforms to the landmarks as determined in the landmark estimation. As one example, the XR device 110 may superimpose a suit of armor onto a person, where the armor segments are attached to the respective body part landmarks and move synchronously with them.

Figure 7:
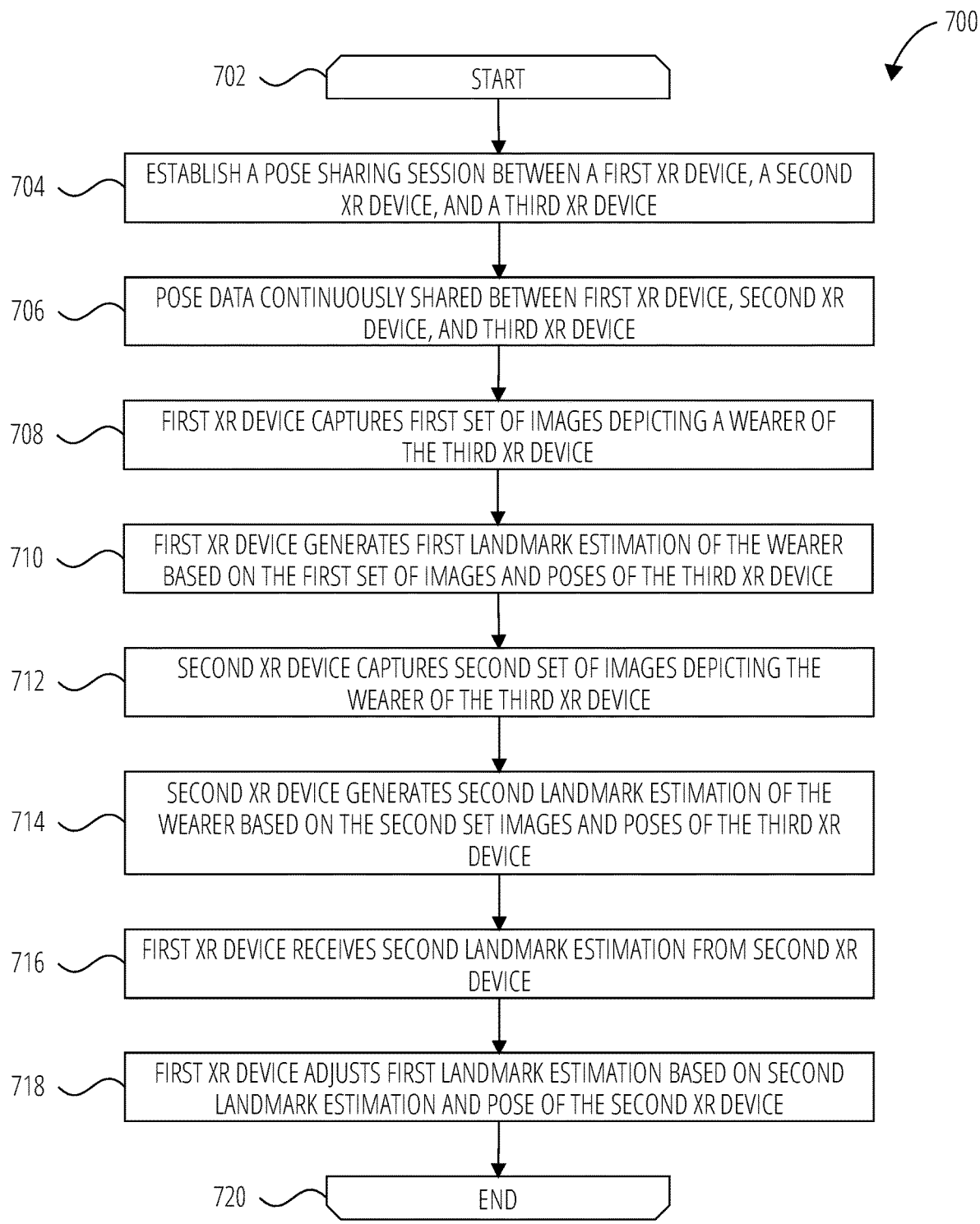
FIG. 7 is a flowchart illustrating a method suitable for tracking a user of an XR device and generating landmark estimations, according to some examples.

Referring now to FIG. 7, a flowchart illustrates a method 700 suitable for tracking a user of an XR device, including the generation of adjusted landmark estimations, according to some examples. Operations in the method 700 may be performed by the first XR device 602, the second XR device 604, and the third XR device 606 of FIG. 6. Accordingly, the method 700 is described by way of example (and not limitation) with reference to the first XR device 602, the second XR device 604, and the third XR device 606 of FIG. 6.

The method 700 commences at opening loop element 702 and proceeds to operation 704, where a pose sharing session is established between the first XR device 602, the second XR device 604, and the third XR device 606. This allows the XR devices 602, 604, and 606 to continuously share (operation 706) their respective poses (e.g., 6DOF poses with timestamps) with each other, based on the shared and synchronized reference coordinate system 608.

The first XR device 602 captures a first set of images depicting the wearer of the third XR device 606 at operation 708, and uses the shared poses of the third XR device 606 and the images to generate a first landmark estimation of the wearer of the third XR device 606 at operation 710. For example, the first XR device 602 may reproject the pose of the third XR device 606 onto an image of the wearer captured at the same time, and use the pose and image data to estimate positions of a set of landmarks. For example, the landmarks may include one or more of: nose, mouth, head, shoulders, elbows, hips, knees, or feet. As mentioned, the use of the shared pose data may enable the first XR device 602 to estimate these landmarks more accurately than would be the case if the first XR device 602 did not have access to the shared pose data.

The second XR device 604 performs the same operations to generate a second landmark estimation. More specifically, at operation 712, the second XR device 604 captures a second set of images depicting the wearer of the third XR device 606 from the perspective of the second XR device 604, and uses the shared poses of the third XR device 606 and these images to generate its own landmark estimation at operation 714.

For example, the first XR device 602 may thus generate a first landmark estimation that includes estimated positions of the shoulders of the wearer of the third XR device 606, while the second XR device 604 generates a second landmark estimation that also includes estimated positions of the shoulders of the wearer of the third XR device 606. It is noted that both the first XR device 602 and the second XR device 604 may identify the wearer of the third XR device 606 based on the matching of the pose data with the captured images, as described elsewhere.

To enhance precision of these landmark estimations, the first XR device 602 and the second XR device 604 may then share their respective landmark estimations with each other. Alternatively, one of the XR devices 602, 604 may share its landmark estimation with the other XR device 602, 604. Alternatively or additionally, the landmark estimations and pose data may be shared with a server (e.g., the server 112) to perform the further processing described below.

Referring specifically to the method 700 of FIG. 7, at operation 716, the second XR device 604 shares the second landmark estimation with the first XR device 602. The first XR device 602 then uses the second landmark estimation, together with the shared pose data it receives from the second XR device 604, to adjust its landmark estimation, e.g., to improve the accuracy of the first landmark estimation at operation 718. The method 700 concludes at closing loop element 720.

Accuracy of a landmark estimation may be improved by way of triangulation. For example, the first XR device 602, having received the poses of the second XR device 604 and the third XR device 606, as well as the landmark estimation generated by the second XR device 604, is able to perform triangulation to arrive at a more precise landmark estimation, e.g., for the shoulders of the wearer of the second XR device 604.

More specifically, in some examples, cameras of the first XR device 602 and the second XR device 604 respectively observe the same object, which in this case is the wearer of the third XR device 606. Each camera observes the same set of landmarks (e.g., distinct points on the wearer, such as the shoulders and/or the nose of the wearer), or a subset thereof if not all landmarks are visible to all cameras. As a result of the pose sharing session between the first XR device 602 and the second XR device 604, the relative pose between the first XR device 602 and the second XR device 604 is known. Using this information, e.g., landmarks as observed using the camera of the first XR device 602, landmarks as observed using the camera of the second XR device 604, as well as the relative pose, triangulation can be performed, which may lead to a more accurate estimate of the landmarks (e.g., a more accurate 3D positional estimate). It is noted that the first XR device 602, the second XR device 604, and/or the third XR device 606 may also share other sensor data to improve certain estimates or detections. For example, the first XR device 602 and the second XR device 604 may each perform stereo depth estimation with respect to the wearer of the third XR device 606. The first XR device 602 may then receive a depth estimation from the second XR device 604 and use the difference between the two depth estimations to update certain data, such as calibration data.

As mentioned above, the first XR device 602, the second XR device 604, and the third XR device 606 may all share their poses with each other. As a result, the relative poses between the three XR devices 602, 604, 606 can be calculated and thus considered to be known. To update calibration data, such as intrinsic and/or extrinsic calibration parameters of cameras or IMUs, the following steps may be performed in some examples:

Two of the XR devices 602, 604, 606, e.g., the first XR device 602 and the second XR device 604, observe landmarks associated with the wearer of the other XR device, e.g., the third XR device 606.

The landmarks associated the wearer of the other XR device are known to that XR device. For example, the landmarks may be points located directly on the third XR device 606, such as corner points on an exterior of the frame of the third XR device 606, with the third XR device 606 storing information indicating the relative positions of these points.

As described above, the landmarks on the wearer of the other XR device can be triangulated using camera observations of the first two XR devices together with their relative pose. This provides a first set of landmark estimations, e.g., 3D positional data.

A second set of landmark estimations can be generated using the landmark positions as known by the other XR device (e.g., the third XR device 606) and the relative poses between the three XR devices.

The two different sets of estimations can be used, together with calibration parameters of the three XR devices, in an optimization problem that provides a solution useful for updating calibrations and/or landmark positions. In this context, "calibrations" may refer to intrinsic and/or extrinsic calibration parameters of cameras or IMUs. For example, a camera may have intrinsic parameters, such as focal length and skew factor, and extrinsic parameters, such as a rotation matrix and a translation vector. An IMU may have intrinsic parameters, such as bias and scale factor, and extrinsic parameters, such as orientation or position relative to a reference point/frame.

Figure 8:
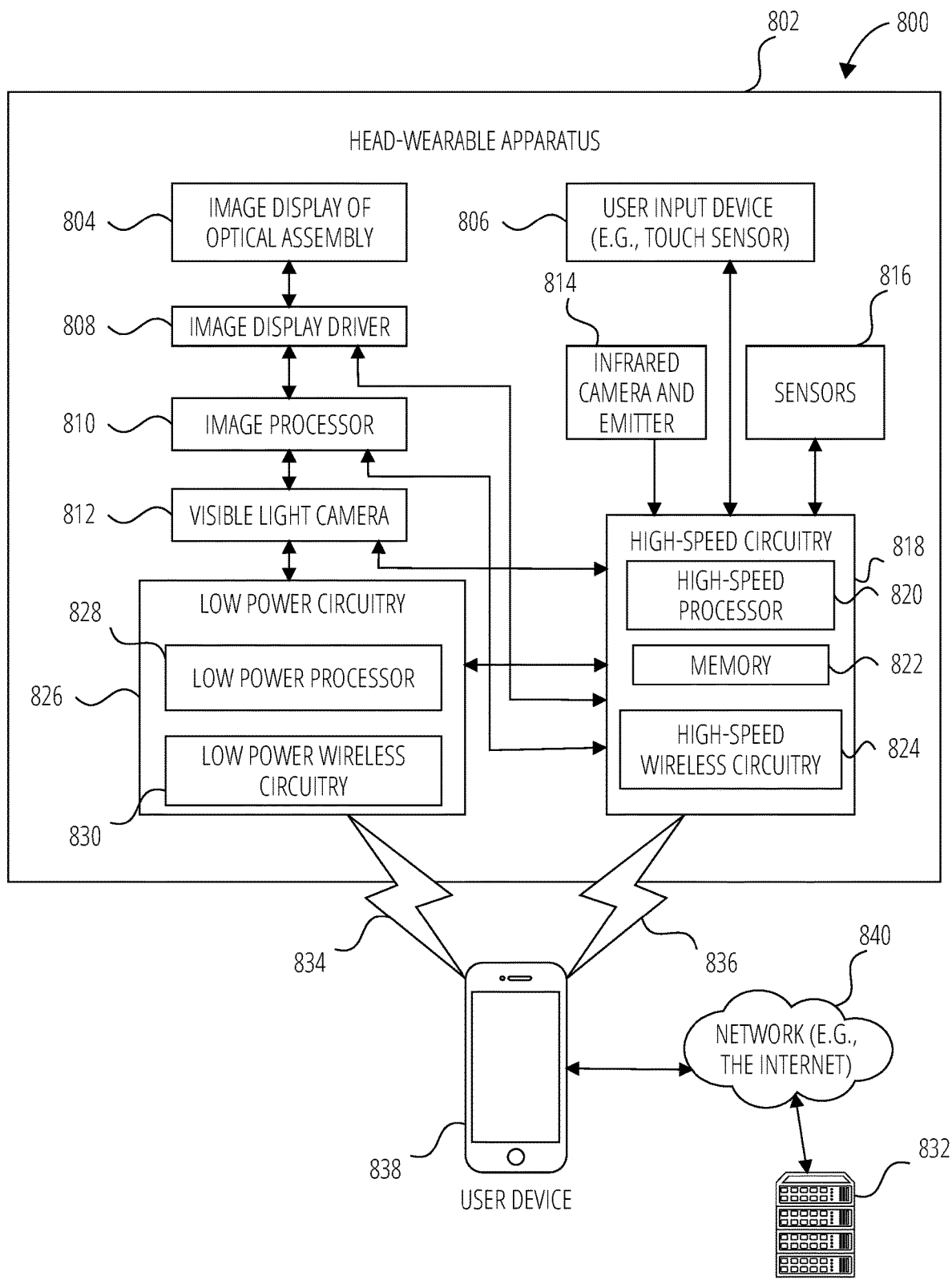
FIG. 8 diagrammatically illustrates a network environment in which a head-wearable apparatus can be implemented, according to some examples.

FIG. 8 illustrates a network environment 800 in which a head-wearable apparatus 802, e.g., a head-wearable XR device (also referred to as a head-mounted XR device), can be implemented according to some examples. FIG. 8 provides a high-level functional block diagram of an example head-wearable apparatus 802 communicatively coupled a mobile user device 838 and a server system 832 via a suitable network 840. One or more of the techniques described herein may be performed using the head-wearable apparatus 802 or a network of devices similar to those shown in FIG. 8.

The head-wearable apparatus 802 includes a camera, such as at least one of a visible light camera 812 and an infrared camera and emitter 814. The head-wearable apparatus 802 includes other sensors 816, such as microphones, motion sensors or eye tracking sensors. The user device 838 can be capable of connecting with head-wearable apparatus 802 using both a communication link 834 and a communication link 836. The user device 838 is connected to the server system 832 via the network 840. The network 840 may include any combination of wired and wireless connections.

The head-wearable apparatus 802 includes a display arrangement that has several components. The arrangement includes two image displays of optical assembly 804. The two displays include one associated with the left lateral side and one associated with the right lateral side of the head-wearable apparatus 802. The head-wearable apparatus 802 also includes an image display driver 808, an image processor 810, low power circuitry 826, and high-speed circuitry 818. The image displays of optical assembly 804 are for presenting images and videos, including images that can provide a graphical user interface (GUI) to a user of the head-wearable apparatus 802.

The image display driver 808 commands and controls the image display of optical assembly 804. The image display driver 808 may deliver image data directly to each image display of the image display of optical assembly 804 for presentation or may have to convert the image data into a signal or data format suitable for delivery to each image display device. For example, the image data may be video data formatted according to compression formats, such as H. 264 (MPEG-4 Part 10), HEVC, Theora, Dirac, RealVideo RV40, VP8, VP9, or the like, and still image data may be formatted according to compression formats such as Portable Network Group (PNG), Joint Photographic Experts Group (JPEG), Tagged Image File Format (TIFF) or exchangeable image file format (Exif) or the like.

The head-wearable apparatus 802 may include a frame and stems (or temples) extending from a lateral side of the frame, or another component to facilitate wearing of the head-wearable apparatus 802 by a user. The head-wearable apparatus 802 of FIG. 8 further includes a user input device 806 (e.g., touch sensor or push button) including an input surface on the head-wearable apparatus 802. The user input device 806 is configured to receive, from the user, an input selection to manipulate the GUI of the presented image.

The components shown in FIG. 8 for the head-wearable apparatus 802 are located on one or more circuit boards, for example a printed circuit board (PCB) or flexible PCB, in the rims or temples. Alternatively, or additionally, the depicted components can be located in the chunks, frames, hinges, or bridges of the head-wearable apparatus 802. Left and right sides of the head-wearable apparatus 802 can each include a digital camera element such as a complementary metal-oxide-semiconductor (CMOS) image sensor, charge coupled device, a camera lens, or any other respective visible or light capturing elements that may be used to capture data, including images of scenes with unknown objects.

The head-wearable apparatus 802 includes a memory 822 which stores instructions to perform a subset or all of the functions described herein. The memory 822 can also include a storage device. As further shown in FIG. 8, the high-speed circuitry 818 includes a high-speed processor 820, the memory 822, and high-speed wireless circuitry 824. In FIG. 8, the image display driver 808 is coupled to the high-speed circuitry 818 and operated by the high-speed processor 820 in order to drive the left and right image displays of the image display of optical assembly 804. The high-speed processor 820 may be any processor capable of managing high-speed communications and operation of any general computing system needed for the head-wearable apparatus 802. The high-speed processor 820 includes processing resources needed for managing high-speed data transfers over the communication link 836 to a wireless local area network (WLAN) using high-speed wireless circuitry 824. In certain examples, the high-speed processor 820 executes an operating system such as a LINUX operating system or other such operating system of the head-wearable apparatus 802 and the operating system is stored in memory 822 for execution. In addition to any other responsibilities, the high-speed processor 820 executing a software architecture for the head-wearable apparatus 802 is used to manage data transfers with high-speed wireless circuitry 824. In certain examples, high-speed wireless circuitry 824 is configured to implement Institute of Electrical and Electronic Engineers (IEEE) 802.11 communication standards, also referred to herein as Wi-Fi™. In other examples, other high-speed communications standards may be implemented by high-speed wireless circuitry 824.

The low power wireless circuitry 830 and the high-speed wireless circuitry 824 of the head-wearable apparatus 802 can include short range transceivers (Bluetooth™) and wireless wide, local, or wide area network transceivers (e.g., cellular or Wi-Fi™). The user device 838, including the transceivers communicating via the communication link 834 and communication link 836, may be implemented using details of the architecture of the head-wearable apparatus 802, as can other elements of the network 840.

The memory 822 includes any storage device capable of storing various data and applications, including, among other things, camera data generated by the visible light camera 812, sensors 816, and the image processor 810, as well as images generated for display by the image display driver 808 on the image displays of the image display of optical assembly 804. While the memory 822 is shown as integrated with the high-speed circuitry 818, in other examples, the memory 822 may be an independent stand-alone element of the head-wearable apparatus 802. In certain such examples, electrical routing lines may provide a connection through a chip that includes the high-speed processor 820 from the image processor 810 or low power processor 828 to the memory 822. In other examples, the high-speed processor 820 may manage addressing of memory 822 such that the low power processor 828 will boot the high-speed processor 820 any time that a read or write operation involving memory 822 is needed.

As shown in FIG. 8, the low power processor 828 or high-speed processor 820 of the head-wearable apparatus 802 can be coupled to the camera (visible light camera 812, or infrared camera and emitter 814), the image display driver 808, the user input device 806 (e.g., touch sensor or push button), and the memory 822. The head-wearable apparatus 802 also includes sensors 816, which may be the motion components 1334, position components 1338, environmental components 1336, and biometric components 1332, e.g., as described below with reference to FIG. 13. In particular, motion components 1334 and position components 1338 are used by the head-wearable apparatus 802 to determine and keep track of the position and orientation (the "pose") of the head-wearable apparatus 802 relative to a frame of reference or another object, in conjunction with a video feed from one of the visible light cameras 812, using for example techniques such as structure from motion (SfM) or VIO.

In some examples, and as shown in FIG. 8, the head-wearable apparatus 802 is connected with a host computer. For example, the head-wearable apparatus 802 is paired with the user device 838 via the communication link 836 or connected to the server system 832 via the network 840. The server system 832 may be one or more computing devices as part of a service or network computing system, for example, that include a processor, a memory, and network communication interface to communicate over the network 840 with the user device 838 and head-wearable apparatus 802.

The user device 838 includes a processor and a network communication interface coupled to the processor. The network communication interface allows for communication over the network 840, communication link 834 or communication link 836. The user device 838 can further store at least portions of the instructions for implementing functionality described herein.

Output components of the head-wearable apparatus 802 include visual components, such as a display (e.g., one or more liquid-crystal display (LCD)), one or more plasma display panel (PDP), one or more light emitting diode (LED) display, one or more projector, or one or more waveguide. The or each image display of optical assembly 804 may be driven by the image display driver 808. The output components of the head-wearable apparatus 802 further include acoustic components (e.g., speakers), haptic components (e.g., a vibratory motor), other signal generators, and so forth. The input components of the head-wearable apparatus 802, the user device 838, and server system 832, such as the user input device 806, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

The head-wearable apparatus 802 may optionally include additional peripheral device elements. Such peripheral device elements may include biometric sensors, additional sensors, or display elements integrated with the head-wearable apparatus 802. For example, peripheral device elements may include any I/O components including output components, motion components, position components, or any other such elements described herein.

For example, the biometric components include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a GPS receiver component), Wi-Fi™ or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over a communication link 836 from the user device 838 via the low power wireless circuitry 830 or high-speed wireless circuitry 824.

Figure 9:
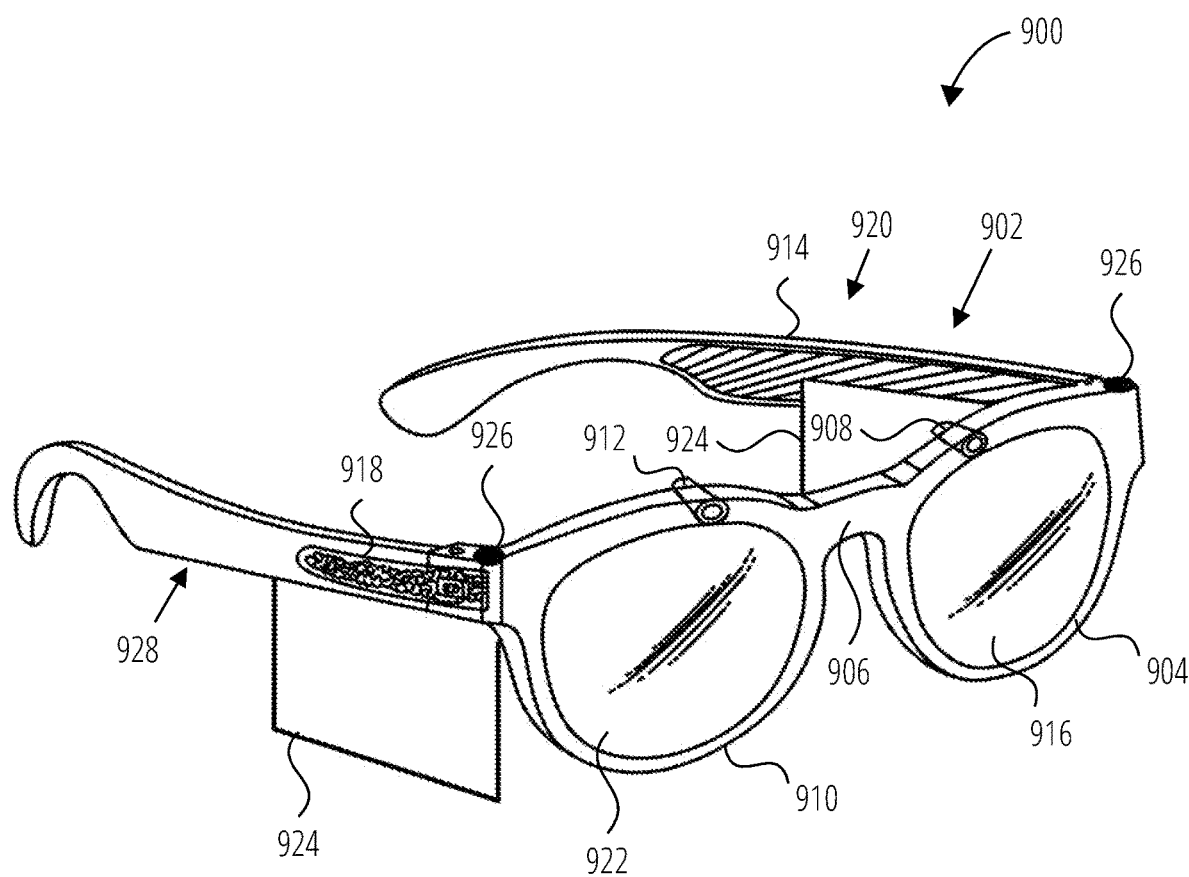
FIG. 9 is a perspective view of a head-wearable apparatus, according to some examples.

FIG. 9 is a perspective view of a head-wearable apparatus in the form of glasses 900, in accordance with some examples. The XR device 110 as described above may include one or more features of the glasses 900. The glasses 900 can include a frame 902 made from any suitable material such as plastic or metal, including any suitable shape memory alloy. In one or more examples, the frame 902 includes a first or left optical element holder 904 (e.g., a display or lens holder) and a second or right optical element holder 910 connected by a bridge 906. A first or left optical element 916 and a second or right optical element 922 can be provided within respective left optical element holder 904 and right optical element holder 910. The right optical element 922 and the left optical element 916 can be a lens, a display, a display assembly, or a combination of the foregoing. Any suitable display assembly can be provided in the glasses 900.

The frame 902 additionally includes a left arm or temple piece 920 and a right arm or temple piece 928. In some examples, the frame 902 can be formed from a single piece of material so as to have a unitary or integral construction.

The glasses 900 can include a computing device, such as a computer 918, which can be of any suitable type so as to be carried by the frame 902 and, in some examples, of a suitable size and shape, so as to be partially disposed in one of the temple piece 920 or the temple piece 928. The computer 918 can include one or more processors with memory, wireless communication circuitry, and a power source. As discussed with reference to FIG. 8 above, the computer 918 may comprise low-power circuitry, high-speed circuitry, and a display processor. Various other examples may include these elements in different configurations or integrated together in different ways. Additional details of aspects of the computer 918 may be implemented as illustrated by the head-wearable apparatus 802 discussed above.

The computer 918 additionally includes a battery 914 or other suitable portable power supply. In some examples, the battery 914 is disposed in left temple piece 920 and is electrically coupled to the computer 918 disposed in the right temple piece 928. The glasses 900 can include a connector or port (not shown) suitable for charging the battery 914 a wireless receiver, transmitter or transceiver (not shown), or a combination of such devices.

The glasses 900 include a first or left camera 908 and a second or right camera 912. Although two cameras 908, 912 are depicted, other examples contemplate the use of a single or additional (i.e., more than two) cameras. In some examples, the glasses 900 include any number of input sensors or other input/output devices in addition to the left camera 908 and the right camera 912. Such sensors or input/output devices can additionally include biometric sensors, location sensors, motion sensors, and so forth. In some examples, the left camera 908 and the right camera 912 provide video frame data for use by the glasses 900 to extract three-dimensional information from a real-world scene, to track objects, to determine relative positions between objects, etc.

The glasses 900 may also include a touchpad 924 mounted to or integrated with one or both of the left temple piece 920 and right temple piece 928. The touchpad 924 is generally vertically-arranged, approximately parallel to a user's temple in some examples. As used herein, generally vertically aligned means that the touchpad is more vertical than horizontal, although potentially more vertical than that. Additional user input may be provided by one or more buttons 926, which in the illustrated examples are provided on the outer upper edges of the left optical element holder 904 and right optical element holder 910. The one or more touchpads 924 and buttons 926 provide a means whereby the glasses 900 can receive input from a user of the glasses 900.

Figure 10:
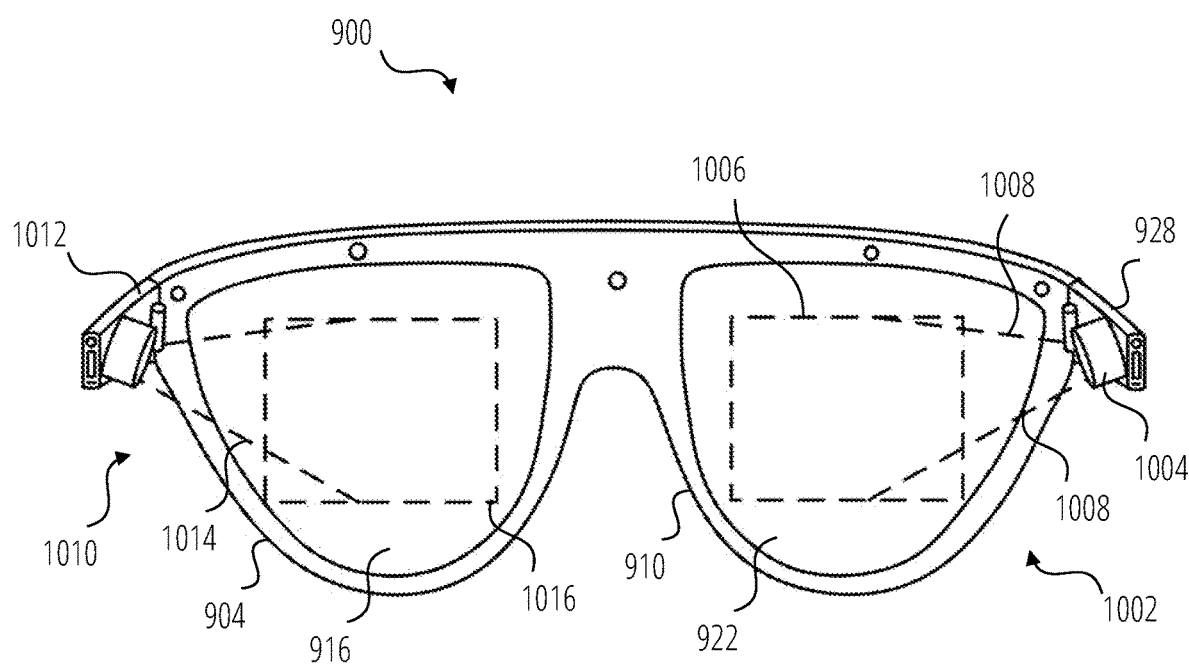
FIG. 10 illustrates a further view of the head-wearable apparatus of FIG. 9, showing the head-wearable apparatus from the perspective of a user, according to some examples.

FIG. 10 illustrates the glasses 900 from the perspective of a user. For clarity, a number of the elements shown in FIG. 9 have been omitted. As described in FIG. 9, the glasses 900 shown in FIG. 10 include left optical element 916 and right optical element 922 secured within the left optical element holder 904 and the right optical element holder 910, respectively.

The glasses 900 include forward optical assembly 1002 comprising a right projector 1004 and a right near eye display 1006, and a forward optical assembly 1010 including a left projector 1012 and a left near eye display 1016.

In some examples, the near eye displays are waveguides. The waveguides include reflective or diffractive structures (e.g., gratings and/or optical elements such as mirrors, lenses, or prisms). Light 1008 emitted by the projector 1004 encounters the diffractive structures of the waveguide of the near eye display 1006, which directs the light 1008 towards the right eye of a user to provide an image on or in the right optical element 922 that overlays the view of the real world seen by the user. Similarly, light 1014 emitted by the projector 1012 encounters the diffractive structures of the waveguide of the near eye display 1016, which directs the light 1014 towards the left eye of a user to provide an image on or in the left optical element 916 that overlays the view of the real world seen by the user. The combination of a GPU, the forward optical assembly 1002, the forward optical assembly 1010, the left optical element 916, and the right optical element 922 may provide an optical engine of the glasses 900. The glasses 900 use the optical engine to generate an overlay of the real-world view of the user including display of a three-dimensional user interface to the user of the glasses 900.

It will be appreciated however that other display technologies or configurations may be utilized within an optical engine to display an image to a user in the user's field of view. For example, instead of a projector 1004 and a waveguide, an LCD, LED or other display panel or surface may be provided.

In use, a user of the glasses 900 will be presented with information, content and various three-dimensional user interfaces on the near eye displays. As described in more detail elsewhere herein, the user can then interact with a device such as the glasses 900 using a touchpad 924 and/or the buttons 926, voice inputs or touch inputs on an associated device (e.g., the user device 838 shown in FIG. 8), and/or hand movements, locations, and positions detected by the glasses 900.

Figure 11:
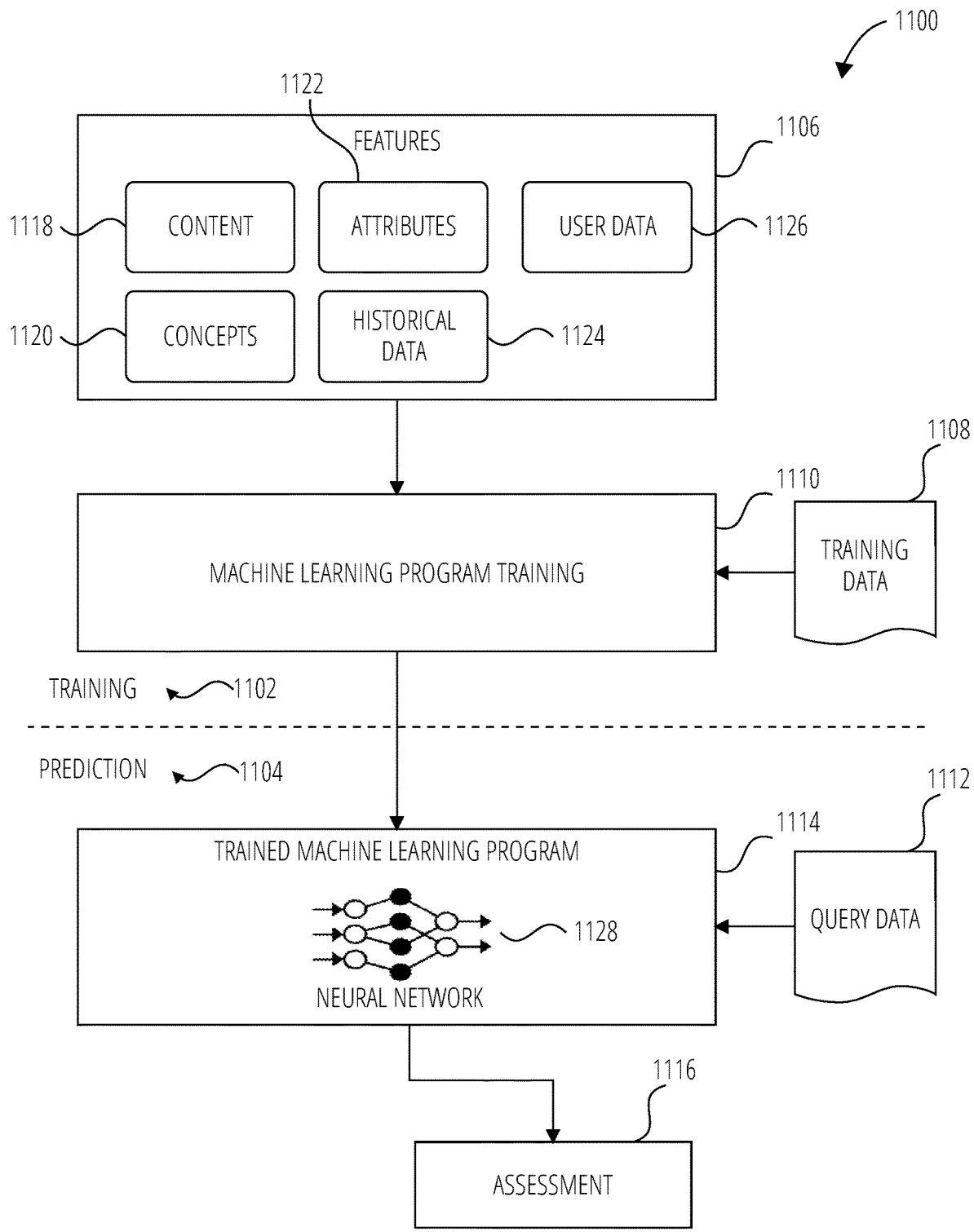
FIG. 11 diagrammatically illustrates training and use of a machine learning program, according to some examples.

FIG. 11 is a block diagram showing a machine learning program 1100, according to some examples. The machine learning programs 1100, also referred to as machine learning algorithms or tools, may be used as part of the systems described herein to perform one or more operations, e.g., performing tracking functions or generating landmark estimations.

Machine learning is a field of study that gives computers the ability to learn without being explicitly programmed. Machine learning explores the study and construction of algorithms, also referred to herein as tools, that may learn from or be trained using existing data and make predictions about or based on new data. Such machine learning tools operate by building a model from example training data 1108 in order to make data-driven predictions or decisions expressed as outputs or assessments (e.g., assessment 1116). Although examples are presented with respect to a few machine learning tools, the principles presented herein may be applied to other machine learning tools.

In some examples, different machine learning tools may be used. For example, Logistic Regression (LR), Naive-Bayes, Random Forest (RF), neural networks (NN), transformers, matrix factorization, and Support Vector Machines (SVM) tools may be used.

Two common types of problems in machine learning are classification problems and regression problems. Classification problems, also referred to as categorization problems, aim at classifying items into one of several category values (for example, is this object an apple or an orange?). Regression algorithms aim at quantifying some items (for example, by providing a value that is a real number).

The machine learning program 1100 supports two types of phases, namely training phases 1102 and prediction phases 1104. In training phases 1102, supervised learning, unsupervised or reinforcement learning may be used. For example, the machine learning program 1100 (1) receives features 1106 (e.g., as structured or labeled data in supervised learning) and/or (2) identifies features 1106 (e.g., unstructured or unlabeled data for unsupervised learning) in training data 1108. In prediction phases 1104, the machine learning program 1100 uses the features 1106 for analyzing query data 1112 to generate outcomes or predictions, as examples of an assessment 1116.

In the training phase 1102, feature engineering is used to identify features 1106 and may include identifying informative, discriminating, and independent features for the effective operation of the machine learning program 1100 in pattern recognition, classification, and regression. In some examples, the training data 1108 includes labeled data, which is known data for pre-identified features 1106 and one or more outcomes. Each of the features 1106 may be a variable or attribute, such as individual measurable property of a process, article, system, or phenomenon represented by a data set (e.g., the training data 1108). Features 1106 may also be of different types, such as numeric features, strings, and graphs, and may include one or more of content 1118, concepts 1120, attributes 1122, historical data 1124 and/or user data 1126, merely for example.

The concept of a feature in this context is related to that of an explanatory variable used in statistical techniques such as linear regression. Choosing informative, discriminating, and independent features is important for the effective operation of the machine learning program 1100 in pattern recognition, classification, and regression. Features may be of different types, such as numeric features, strings, and graphs.

In training phases 1102, the machine learning program 1100 uses the training data 1108 to find correlations among the features 1106 that affect a predicted outcome or assessment 1116.

With the training data 1108 and the identified features 1106, the machine learning program 1100 is trained during the training phase 1102 at machine learning program training 1110. The machine learning program 1100 appraises values of the features 1106 as they correlate to the training data 1108. The result of the training is the trained machine learning program 1114 (e.g., a trained or learned model).

Further, the training phases 1102 may involve machine learning, in which the training data 1108 is structured (e.g., labeled during preprocessing operations), and the trained machine learning program 1114 implements a relatively simple neural network 1128 capable of performing, for example, classification and clustering operations. In other examples, the training phase 1102 may involve deep learning, in which the training data 1108 is unstructured, and the trained machine learning program 1114 implements a deep neural network 1128 that is able to perform both feature extraction and classification/clustering operations.

A neural network 1128 generated during the training phase 1102, and implemented within the trained machine learning program 1114, may include a hierarchical (e.g., layered) organization of neurons. For example, neurons (or nodes) may be arranged hierarchically into a number of layers, including an input layer, an output layer, and multiple hidden layers. Each of the layers within the neural network 1128 can have one or many neurons and each of these neurons operationally computes a small function (e.g., activation function). For example, if an activation function generates a result that transgresses a particular threshold, an output may be communicated from that neuron (e.g., transmitting neuron) to a connected neuron (e.g., receiving neuron) in successive layers. Connections between neurons also have associated weights, which defines the influence of the input from a transmitting neuron to a receiving neuron.

In some examples, the neural network 1128 may also be one of a number of different types of neural networks, including a single-layer feed-forward network, an Artificial Neural Network (ANN), a Recurrent Neural Network (RNN), a transformer, a symmetrically connected neural network, and unsupervised pre-trained network, a Convolutional Neural Network (CNN), or a Recursive Neural Network (RNN), merely for example.

During prediction phases 1104, the trained machine learning program 1114 is used to perform an assessment. Query data 1112 is provided as an input to the trained machine learning program 1114, and the trained machine learning program 1114 generates the assessment 1116 as output, responsive to receipt of the query data 1112.

Figure 12:
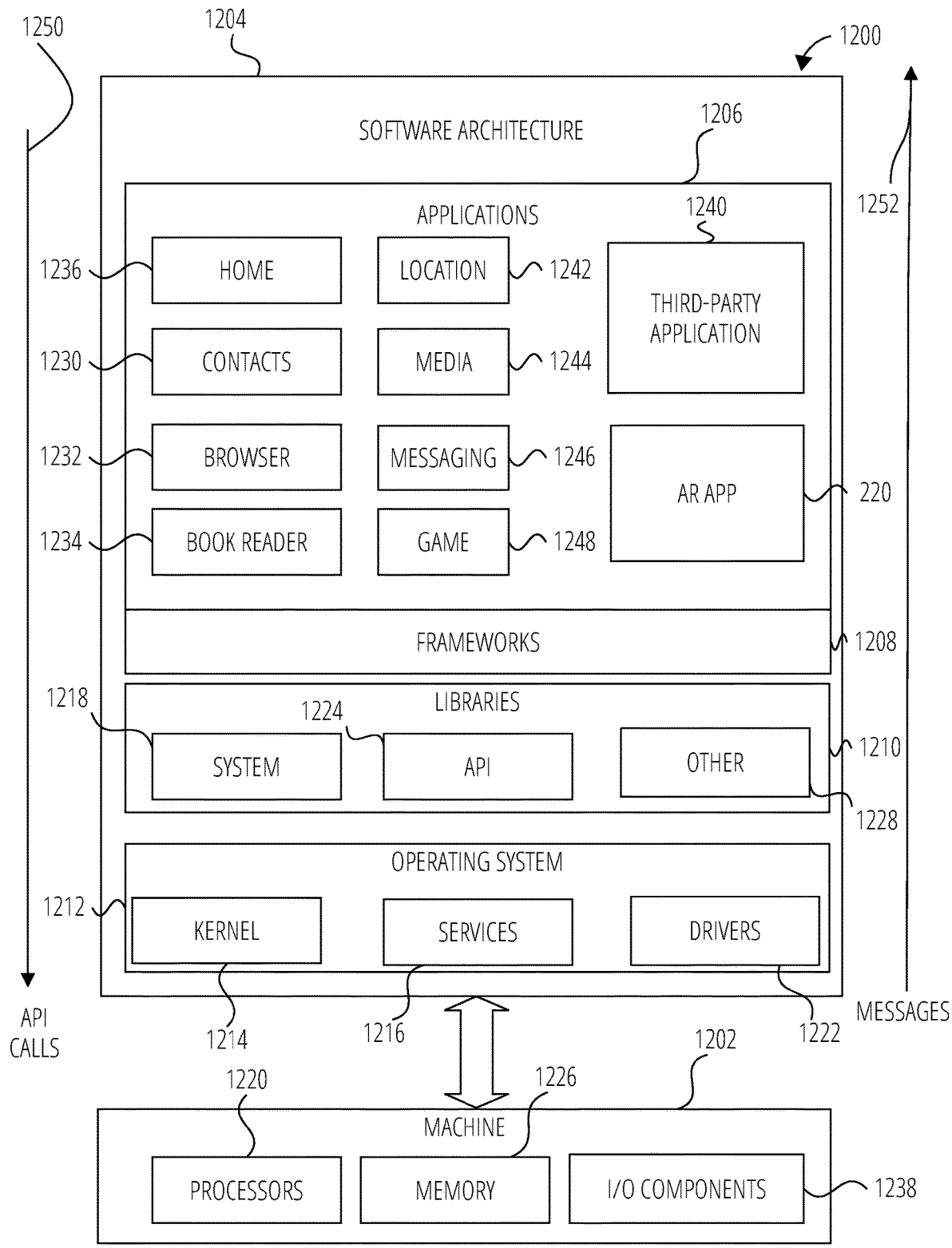
FIG. 12 is block diagram showing a software architecture within which the present disclosure may be implemented, according to some examples.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and input/output, or I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke Application Programming Interface calls, or API calls 1250, through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionalities. The services 1216 can provide other common services for the other software layers. The drivers 1222 are responsible for controlling or interfacing with the underlying hardware. For instance, the drivers 1222 can include display drivers, camera drivers, Bluetooth™ or Bluetooth™ Low Energy drivers, flash memory drivers, serial communication drivers (e.g., Universal Serial Bus (USB) drivers), WI-FI™ drivers, audio drivers, power management drivers, and so forth.

The libraries 1210 provide a low-level common infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions and three dimensions in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a high-level common infrastructure that is used by the applications 1206. For example, the frameworks 1208 provide various GUI functions, high-level resource management, and high-level location services. The frameworks 1208 can provide a broad spectrum of other APIs that can be used by the applications 1206, some of which may be specific to a particular operating system or platform.

In some examples, the applications 1206 may include a home application 1236, a contacts application 1230, a browser application 1232, a book reader application 1234, a location application 1242, a media application 1244, a messaging application 1246, a game application 1248, and a broad assortment of other applications such as a third-party application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In some examples, the third-party application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In FIG. 12, the third-party application 1240 can invoke the API calls 1250 provided by the operating system 1212 to facilitate functionality described herein. The applications 1206 may include an AR application such as the AR application 220 described herein, according to some examples.

Figure 13:
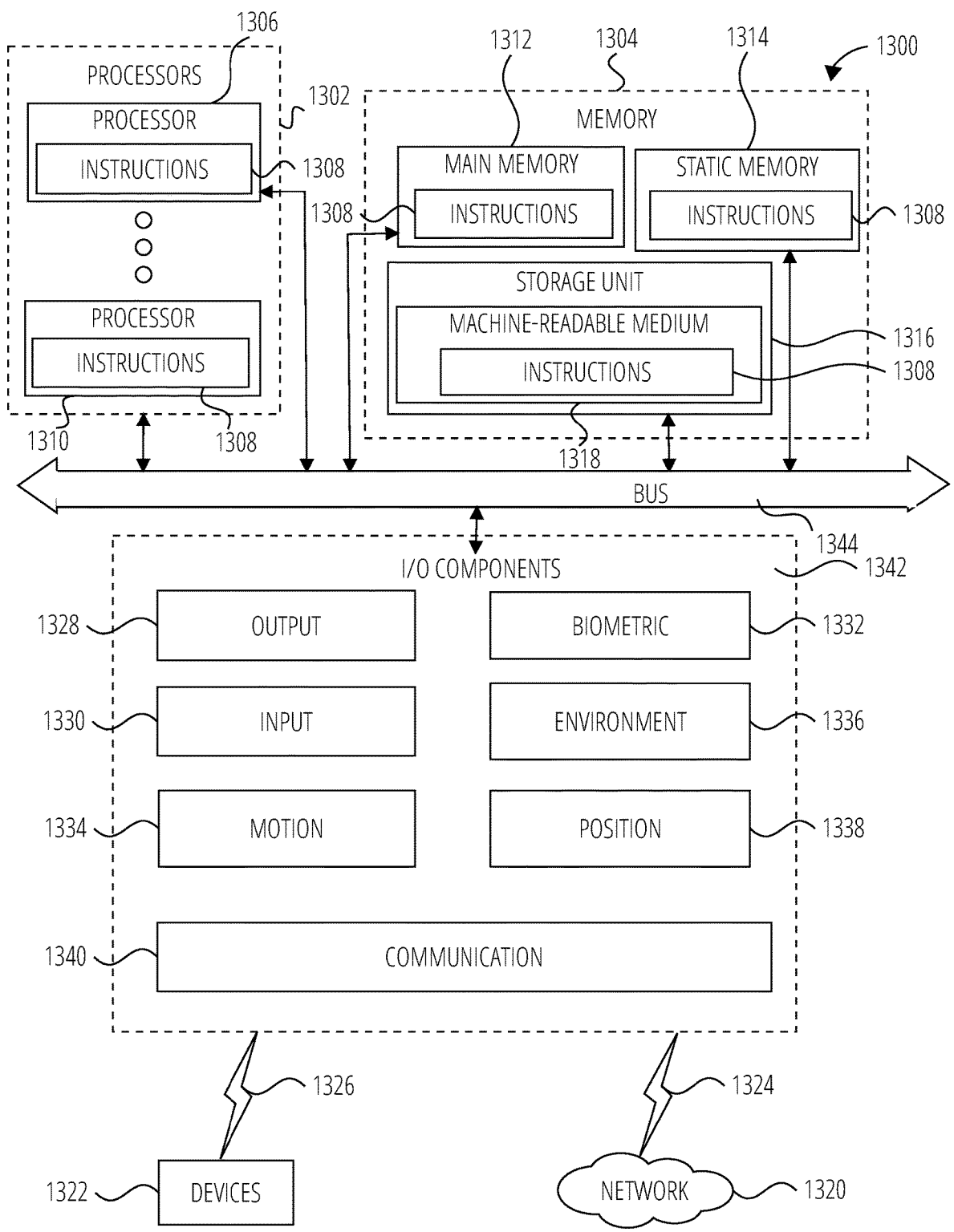
FIG. 13 is a diagrammatic representation of a machine in the form of a computer system within which a set of instructions may be executed for causing the machine to perform any one or more of the methodologies discussed herein, according to some examples.

FIG. 13 is a diagrammatic representation of a machine 1300 within which instructions 1308 (e.g., software, a program, an application, an applet, an app, or other executable code) for causing the machine 1300 to perform any one or more of the methodologies discussed herein may be executed. For example, the instructions 1308 may cause the machine 1300 to execute any one or more of the methods described herein. The instructions 1308 transform the general, non-programmed machine 1300 into a particular machine 1300 programmed to carry out the described and illustrated functions in the manner described. The machine 1300 may operate as a standalone device or may be coupled (e.g., networked) to other machines. In a networked deployment, the machine 1300 may operate in the capacity of a server machine or a client machine in a server-client network environment, or as a peer machine in a peer-to-peer (or distributed) network environment. The machine 1300 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), XR device, AR device, VR device, a smart home device (e.g., a smart appliance), other smart devices, a web appliance, a network router, a network switch, a network bridge, or any machine capable of executing the instructions 1308, sequentially or otherwise, that specify actions to be taken by the machine 1300. Further, while only a single machine 1300 is illustrated, the term "machine" shall also be taken to include a collection of machines that individually or jointly execute the instructions 1308 to perform any one or more of the methodologies discussed herein.

The machine 1300 may include processors 1302, memory 1304, and I/O components 1342, which may be configured to communicate with each other via a bus 1344. In some examples, the processors 1302 (e.g., a Central Processing Unit (CPU), a Reduced Instruction Set Computing (RISC) processor, a Complex Instruction Set Computing (CISC) Processor, a Graphics Processing Unit, a Digital Signal Processor (DSP), an Application-Specific Integrated Circuit (ASIC), a Radio-Frequency Integrated Circuit (RFIC), another processor, or any suitable combination thereof) may include, for example, a processor 1306 and a processor 1310 that execute the instructions 1308. The term "processor" is intended to include multi-core processors that may comprise two or more independent processors (sometimes referred to as "cores") that may execute instructions contemporaneously. Although FIG. 13 shows multiple processors 1302, the machine 1300 may include a single processor with a single core, a single processor with multiple cores (e.g., a multi-core processor), multiple processors with a single core, multiple processors with multiples cores, or any combination thereof.

The memory 1304 includes a main memory 1312, a static memory 1314, and a storage unit 1316, accessible to the processors via the bus 1344. The main memory 1304, the static memory 1314, and storage unit 1316 store the instructions 1308 embodying any one or more of the methodologies or functions described herein. The instructions 1308 may also reside, completely or partially, within the main memory 1312, within the static memory 1314, within machine-readable medium 1318 within the storage unit 1316, within at least one of the processors, or any suitable combination thereof, during execution thereof by the machine 1300.

The I/O components 1342 may include a wide variety of components to receive input, provide output, produce output, transmit information, exchange information, capture measurements, and so on. The specific I/O components 1342 that are included in a particular machine will depend on the type of machine. For example, portable machines such as mobile phones may include a touch input device or other such input mechanisms, while a headless server machine will likely not include such a touch input device. It will be appreciated that the I/O components 1342 may include many other components that are not shown in FIG. 13. In various examples, the I/O components 1342 may include output components 1328 and input components 1330. The output components 1328 may include visual components (e.g., a display such as a PDP, an LED display, a LCD, a projector, or a cathode ray tube (CRT)), acoustic components (e.g., speakers), haptic components (e.g., a vibratory motor, resistance mechanisms), other signal generators, and so forth. The input components 1330 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In some examples, the I/O components 1342 may include biometric components 1332, motion components 1334, environmental components 1336, or position components 1338, among a wide array of other components. For example, the biometric components 1332 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1334 include acceleration sensor components (e.g., accelerometer), gravitation sensor components, rotation sensor components (e.g., gyroscope), and so forth. The environmental components 1336 include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensor (e.g., gas detection sensor to detection concentrations of hazardous gases for safety or to measure pollutants in the atmosphere), or other components that may provide indications, measurements, or signals corresponding to a surrounding physical environment. The position components 1338 include location sensor components (e.g., a GPS receiver components), altitude sensor components (e.g., altimeters or barometers that detect air pressure from which altitude may be derived), orientation sensor components (e.g., magnetometers), and the like.

Any biometric data collected by the biometric components is captured and stored with only user approval and deleted on user request. Further, such biometric data may be used for very limited purposes, such as identification verification. To ensure limited and authorized use of biometric information and other personally identifiable information (PII), access to this data is restricted to authorized personnel only, if at all. Any use of biometric data may strictly be limited to identification verification purposes, and the biometric data is not shared or sold to any third party without the explicit consent of the user. In addition, appropriate technical and organizational measures are implemented to ensure the security and confidentiality of this sensitive information.

Communication may be implemented using a wide variety of technologies. The I/O components 1342 further include communication components 1340 operable to couple the machine 1300 to a network 1320 or devices 1322 via a coupling 1324 and a coupling 1326, respectively. For example, the communication components 1340 may include a network interface component or another suitable device to interface with the network 1320. In further examples, the communication components 1340 may include wired communication components, wireless communication components, cellular communication components, Near Field Communication (NFC) components, Bluetooth™ components, Wi-Fi™ components, and other communication components to provide communication via other modalities. The devices 1322 may be another machine or any of a wide variety of peripheral devices (e.g., a peripheral device coupled via a USB).

Moreover, the communication components 1340 may detect identifiers or include components operable to detect identifiers. For example, the communication components 1340 may include Radio Frequency Identification (RFID) tag reader components, NFC smart tag detection components, optical reader components (e.g., an image sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1340, such as location via Internet Protocol (IP) geolocation, location via Wi-Fi™ signal triangulation, location via detecting an NFC beacon signal that may indicate a particular location, and so forth.

The various memories (e.g., memory 1304, main memory 1312, static memory 1314, and/or memory of the processors 1302) and/or storage unit 1316 may store one or more sets of instructions and data structures (e.g., software) embodying or used by any one or more of the methodologies or functions described herein. These instructions (e.g., the instructions 1308), when executed by processors 1302, cause various operations to implement the disclosed examples.

The instructions 1308 may be transmitted or received over the network 1320, using a transmission medium, via a network interface device (e.g., a network interface component included in the communication components 1340) and using any one of a number of well-known transfer protocols (e.g., hypertext transfer protocol (HTTP)). Similarly, the instructions 1308 may be transmitted or received using a transmission medium via the coupling 1326 (e.g., a peer-to-peer coupling) to the devices 1322.

As used herein, the terms "machine-storage medium," "device-storage medium," and "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks.

The terms "transmission medium" and "signal medium" mean the same thing and may be used interchangeably in this disclosure. The terms "transmission medium" and "signal medium" shall be taken to include any intangible medium that is capable of storing, encoding, or carrying the instructions for execution by the machine 1300, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Although aspects have been described with reference to specific examples, it will be evident that various modifications and changes may be made to these examples without departing from the broader scope of the present disclosure. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

It shall be appreciated that at least some of the operations of the method 400 or the method 700, and operations related to the interactions shown in the diagram 300, the diagram 500, or the diagram 600, may be deployed on various other hardware configurations or be performed by similar components residing elsewhere. The term "operation" is used to refer to elements in the drawings for ease of reference and it will be appreciated that each "operation" may identify one or more operations, processes, actions, or steps.

As used in this disclosure, phrases of the form "at least one of an A, a B, or a C," "at least one of A, B, or C," "at least one of A, B, and C," and the like, should be interpreted to select at least one from the group that comprises "A, B, and C." Unless explicitly stated otherwise in connection with a particular instance in this disclosure, this manner of phrasing does not mean "at least one of A, at least one of B, and at least one of C." As used in this disclosure, the example "at least one of an A, a B, or a C," would cover any of the following selections: {A}, {B}, {C}, {A, B}, {A, C}, {B, C}, and {A, B, C}.

Unless the context clearly requires otherwise, throughout the description and the claims, the words "comprise," "comprising," and the like are to be construed in an inclusive sense, as opposed to an exclusive or exhaustive sense, e.g., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise, the term "and/or" in reference to a list of two or more items, covers all of the following interpretations of the word: any one of the items in the list, all of the items in the list, and any combination of the items in the list.

Although some examples, e.g., those depicted in the drawings, include a particular sequence of operations, the sequence may be altered without departing from the scope of the present disclosure. For example, some of the operations depicted may be performed in parallel or in a different sequence that does not materially affect the functions as described in the examples. In other examples, different components of an example device or system that implements an example method may perform functions at substantially the same time or in a specific sequence.

The various features, steps, operations, and processes described herein may be used independently of one another, or may be combined in various ways. All possible combinations and subcombinations are intended to fall within the scope of this disclosure. In addition, certain method or process blocks or operations may be omitted in some implementations.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in examples for the purpose of streamlining the disclosure. This method of disclosure is not to be interpreted as reflecting an intention that the examples require more features than are expressly recited in each claim. Rather, as the following claims reflect, inventive subject matter lies in less than all features of a single disclosed example. Thus the following claims are hereby incorporated into the Detailed Description, with each claim standing on its own as a separate example.

EXAMPLES

In view of the above-described implementations of subject matter this application discloses the following list of examples, wherein one feature of an example in isolation, or more than one feature of an example taken in combination, and, optionally, in combination with one or more features of one or more further examples, are further examples also falling within the disclosure of this application.

Example 1 is a method performed by a first extended reality (XR) device, the method comprising: establishing a communication link between the first XR device and a second XR device that is worn by a user; receiving, via the communication link, pose data of the second XR device; capturing an image of the user; and identifying the user based on the image and the pose data.

In Example 2, the subject matter of Example 1 includes, wherein the establishing of the communication link comprises establishing a pose sharing session that enables the first XR device to track a pose of the second XR device based on the pose data, and the pose data is updated during the pose sharing session to reflect changes in the pose of the second XR device over time.

In Example 3, the subject matter of Example 2 includes, subsequent to identifying the user: determining, based on the tracking of the pose of the second XR device, that the user has exited a camera field of view of the first XR device.

In Example 4, the subject matter of Example 3 includes, subsequent to determining that the user has exited the camera field of view: determining, based on the tracking of the pose of the second XR device, that the user has re-entered the camera field of view.

In Example 5, the subject matter of any of Examples 1-4 includes, wherein the identifying of the user comprises: projecting the pose data onto the image; and matching the projected pose data with the user in the image.

In Example 6, the subject matter of any of Examples 1-5 includes, responsive to the identifying of the user, rendering, based on the image and the pose data, an augmentation with respect to the user, wherein the augmentation is uniquely rendered for and associated with the user; and causing presentation of the augmentation on a display of the first XR device.

In Example 7, the subject matter of Example 6 includes, wherein the user is a second user, and wherein causing the presentation of the augmentation on the display of the first XR device comprises causing the augmentation to appear at least partially overlaid on the second user from a viewing perspective of a first user wearing the first XR device.

In Example 8, the subject matter of any of Examples 6-7 includes, wherein the image is a first image, and wherein the method further comprises, subsequent to the presentation of the augmentation on the display of the first XR device: determining, based on the pose data, that the user has exited and re-entered a camera field of view of the XR device; capturing a second image of the user; and re-identifying the user by matching the pose data of the second XR device with the user in the second image.

In Example 9, the subject matter of Example 8 includes, responsive to re-identifying the user: identifying the augmentation associated with the user, and re-rendering the augmentation with respect to the user.

In Example 10, the subject matter of any of Examples 2-9 includes, wherein the pose of the second XR device comprises a position and orientation of the second XR device expressed in six degrees of freedom.

In Example 11, the subject matter of any of Examples 1-10 includes, wherein the pose data comprises a plurality of poses generated by a Simultaneous Localization and Mapping (SLAM) system of the second XR device at different points in time.

In Example 12, the subject matter of any of Examples 1-11 includes, wherein the image is a first image, and the method further comprises: capturing a plurality of additional images of the user; and determining, based on the first image, the plurality of additional images, and the pose data, a trajectory of the second XR device.

In Example 13, the subject matter of any of Examples 1-12 includes, prior to identifying the user: aligning a spatial reference system of the first XR device with a spatial reference system of the second XR device.

In Example 14, the subject matter of Example 13 includes, wherein aligning of the spatial reference system of the first XR device with the spatial reference system of the second XR device comprises scanning a common marker.

In Example 15, the subject matter of Example 14 includes, wherein aligning of the spatial reference system of the first XR device with the spatial reference system of the second XR device comprises ego-motion alignment.

In Example 16, the subject matter of any of Examples 1-15 includes, generating, based on the image and the pose data, a body tracking prediction associated with the user.

In Example 17, the subject matter of any of Examples 1-16 includes, wherein the communication link is a first communication link, and the method further comprises: generating, based on the image and the pose data of the second XR device, a first landmark estimation for a detected body part of the user; establishing a second communication link between the first XR device and a third XR device, wherein the third XR device uses the pose data of the second XR device to generate a second landmark estimation for the detected body part; receiving, via the second communication link, the second landmark estimation and pose data of the third XR device; and processing the second landmark estimation and the pose data of the third XR device to adjust the first landmark estimation.

In Example 18, the subject matter of any of Examples 2-17 includes, during the pose sharing session, transmitting, via the communication link, pose data of the first XR device to the second XR device.

Example 19 is a first extended reality (XR) device comprising: at least one memory that stores instructions; and at least one processor configured by the instructions to perform operations comprising: establishing a communication link between the first XR device and a second XR device that is worn by a user; receiving, via the communication link, pose data of the second XR device; capturing an image of the user; and identifying the user based on the image and the pose data.

Example 20 is a non-transitory computer-readable storage medium, the computer-readable storage medium including instructions that when executed by at least one processor of a first extended reality (XR) device, cause the at least one processor to perform operations comprising: establishing a communication link between the first XR device and a second XR device that is worn by a user; receiving, via the communication link, pose data of the second XR device; capturing an image of the user; and identifying the user based on the image and the pose data.

Example 21 is at least one machine-readable medium including instructions that, when executed by processing circuitry, cause the processing circuitry to perform operations to implement any of Examples 1-20.

Example 22 is an apparatus comprising means to implement any of Examples 1-20.

Example 23 is a system to implement any of Examples 1-20.

Example 24 is a method to implement any of Examples 1-20.

What is claimed is:

1. A method performed by a first extended reality (XR) device, the method comprising:
   establishing a communication link between the first XR device and a second XR device that is worn by a user;

receiving, via the communication link, pose data of the second XR device;
capturing an image of the user; and
identifying the user based on the image and the pose data of the second XR device, wherein the identifying of the user comprises:
projecting at least a subset of the pose data of the second XR device onto the image to obtain at least one two-dimensional (2D) projected position of the second XR device; and
determining that the user depicted in the image corresponds to the at least one 2D projected position of the second XR device.

2. The method of claim 1, wherein the establishing of the communication link comprises establishing a pose sharing session that enables the first XR device to track a pose of the second XR device based on the pose data, and the pose data is updated during the pose sharing session to reflect changes in the pose of the second XR device over time.

3. The method of claim 2, further comprising, subsequent to identifying the user:
determining, based on the tracking of the pose of the second XR device, that the user has exited a camera field of view of the first XR device.

4. The method of claim 3, further comprising, subsequent to determining that the user has exited the camera field of view:
determining, based on the tracking of the pose of the second XR device, that the user has re-entered the camera field of view.

5. The method of claim 1, further comprising:
based on the identifying of the user, rendering, based on the image and the pose data, an augmentation with respect to the user, wherein the augmentation is uniquely rendered for and associated with the user; and
causing presentation of the augmentation on a display of the first XR device.

6. The method of claim 5, wherein the user is a second user, and wherein causing the presentation of the augmentation on the display of the first XR device comprises causing the augmentation to appear at least partially overlaid on the second user from a viewing perspective of a first user wearing the first XR device.

7. The method of claim 5, wherein the image is a first image, and wherein the method further comprises, subsequent to the presentation of the augmentation on the display of the first XR device:
determining, based on the pose data, that the user has exited and re-entered a camera field of view of the XR device;
capturing a second image of the user; and
re-identifying the user by matching the pose data of the second XR device with the user in the second image.

8. The method of claim 7, further comprising:
based on re-identifying the user:
identifying the augmentation associated with the user, and
re-rendering the augmentation with respect to the user.

9. The method of claim 2, wherein the pose of the second XR device comprises a position and orientation of the second XR device expressed in six degrees of freedom.

10. The method of claim 1, wherein the pose data comprises a plurality of poses generated by a Simultaneous Localization and Mapping (SLAM) system of the second XR device at different points in time.

11. The method of claim 1, wherein the image is a first image, and the method further comprises:
capturing a plurality of additional images of the user; and
determining, based on the first image, the plurality of additional images, and the pose data, a trajectory of the second XR device.

12. The method of claim 1, further comprising, prior to identifying the user:
aligning a spatial reference system of the first XR device with a spatial reference system of the second XR device.

13. The method of claim 12, wherein aligning of the spatial reference system of the first XR device with the spatial reference system of the second XR device comprises scanning a common marker.

14. The method of claim 13, wherein aligning of the spatial reference system of the first XR device with the spatial reference system of the second XR device comprises ego-motion alignment.

15. The method of claim 1, further comprising:
generating, based on the image and the pose data, a body tracking prediction associated with the user.

16. The method of claim 1, wherein the communication link is a first communication link, and the method further comprises:
generating, based on the image and the pose data of the second XR device, a first landmark estimation for a detected body part of the user;
establishing a second communication link between the first XR device and a third XR device, wherein the third XR device uses the pose data of the second XR device to generate a second landmark estimation for the detected body part;
receiving, via the second communication link, the second landmark estimation and pose data of the third XR device; and
processing the second landmark estimation and the pose data of the third XR device to adjust the first landmark estimation.

17. The method of claim 2, further comprising:
during the pose sharing session, transmitting, via the communication link, pose data of the first XR device to the second XR device.

18. A first extended reality (XR) device comprising:
at least one memory that stores instructions; and
at least one processor configured by the instructions to perform operations comprising:
establishing a communication link between the first XR device and a second XR device that is worn by a user;
receiving, via the communication link, pose data of the second XR device;
capturing an image of the user; and
identifying the user based on the image and the pose data of the second XR device, wherein the identifying of the user comprises:
projecting at least a subset of the pose data of the second XR device onto the image to obtain at least one two-dimensional (2D) projected position of the second XR device; and
determining that the user depicted in the image corresponds to the at least one 2D projected position of the second XR device.

19. A non-transitory computer-readable storage medium, the computer-readable storage medium including instructions that when executed by at least one processor of a first extended reality (XR) device, cause the at least one processor to perform operations comprising:

establishing a communication link between the first XR device and a second XR device that is worn by a user;
receiving, via the communication link, pose data of the second XR device;
capturing an image of the user; and
identifying the user based on the image and the pose data of the second XR device, wherein the identifying of the user comprises:
  projecting at least a subset of the pose data of the second XR device onto the image to obtain at least one two-dimensional (2D) projected position of the second XR device; and
  determining that the user depicted in the image corresponds to the at least one 2D projected position of the second XR device.

20. The first XR device of claim 18, the operations further comprising:
based on the identifying of the user, rendering, based on the image and the pose data, an augmentation with respect to the user, wherein the augmentation is uniquely rendered for and associated with the user; and
causing presentation of the augmentation on a display of the first XR device.

\* \* \* \* \*